United States Patent [19]
Kamimura

[11] Patent Number: 5,954,610
[45] Date of Patent: Sep. 21, 1999

[54] SPEED CHANGE GEAR ASSEMBLY

[75] Inventor: Ichirou Kamimura, Hiroshima, Japan

[73] Assignee: Namu Co., Ltd., Hiroshima, Japan

[21] Appl. No.: 09/032,997

[22] Filed: Mar. 2, 1998

[30] Foreign Application Priority Data

Mar. 4, 1997 [JP] Japan .................................. 9-065410

[51] Int. Cl.$^6$ ............................................... F16H 1/00
[52] U.S. Cl. .............................................. 475/180; 409/51
[58] Field of Search ................... 475/163, 180; 409/51

[56] References Cited

U.S. PATENT DOCUMENTS

| | | | |
|---|---|---|---|
| 2,953,944 | 9/1960 | Sundt | 475/163 |
| 4,041,808 | 8/1977 | Fickelscher | 475/180 |
| 4,054,966 | 10/1977 | Putsch et al. | 475/163 |
| 4,702,126 | 10/1987 | Nakamura | 475/180 |
| 4,946,428 | 8/1990 | Barozzi | 475/180 |

FOREIGN PATENT DOCUMENTS

A-7-56324  3/1995  Japan .

OTHER PUBLICATIONS

Nikkei Mechanical, No. 492, pp. 12–13, Oct. 28, 1996.

*Primary Examiner*—Dirk Wright
*Attorney, Agent, or Firm*—Oliff & Berridge, PLC

[57] ABSTRACT

In order to miniaturize a speed change gear assembly, the respective gears are arranged in the order of the first gear $A_1$, the second gear $A_2$, the fourth gear $A_4$ and the third gear $A_3$ in an axial direction (X-axis direction). A center of the common spherical surface passing through each pitch circle of the first and second gears is made in accordance with the center of the common spherical surface passing through each pitch circle of the fourth and third gears. The center is used as the origin O. An XY coordinate is provided on the origin O. An axis line of an input shaft is arranged on the X-axis of the XY coordinate. An engagement point between the first and second gears $A_1$ and $A_2$ and an engagement point of the fourth and third gears $A_3$ and $A_4$ are arranged in the same quadrant of the XY coordinate. The first to fourth gears are arranged on the same axial direction surface of a rotary member 3. It is therefore possible to thereby reduce the axial directional dimension of the gear assembly.

15 Claims, 16 Drawing Sheets

F I G. 14
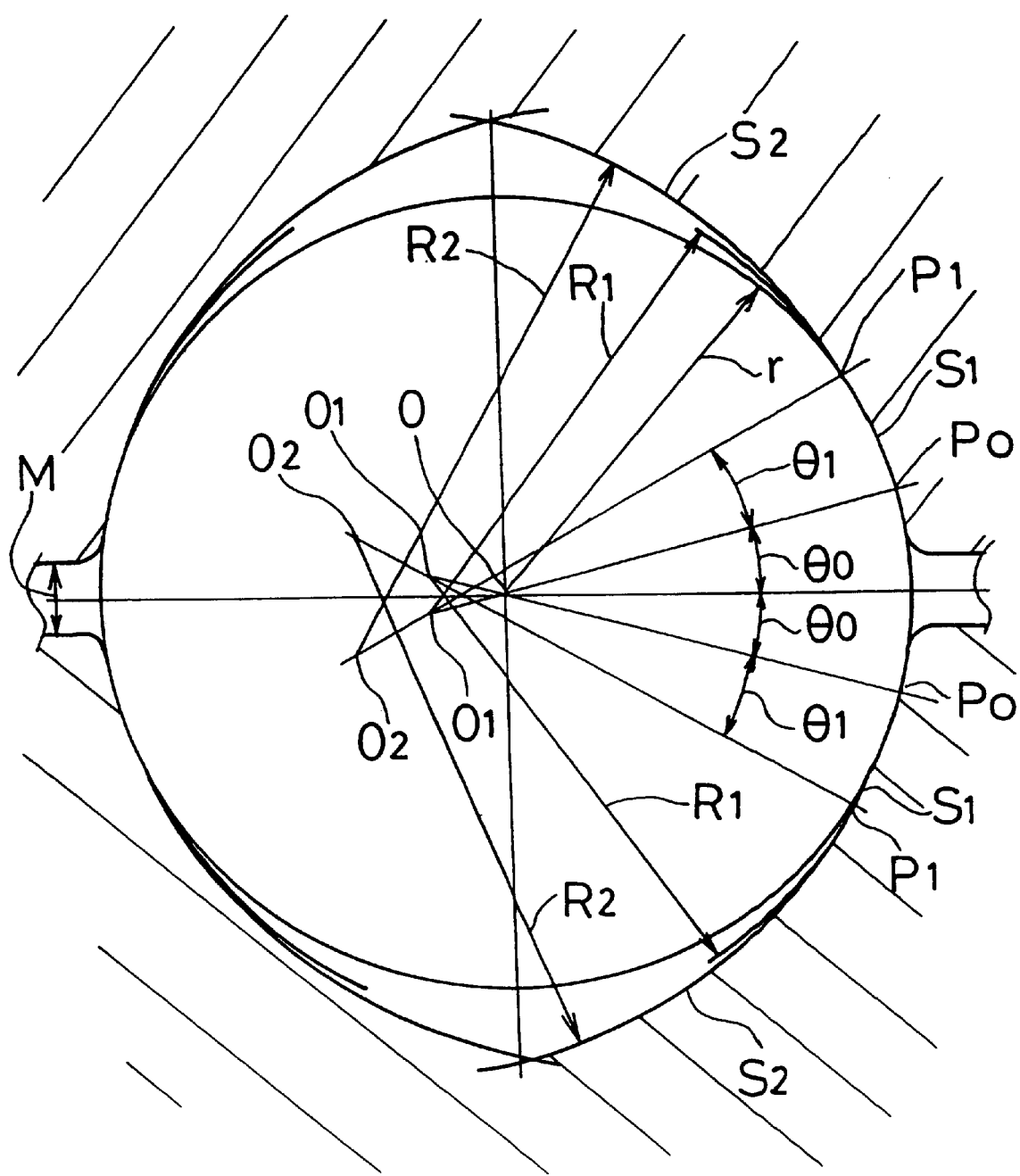

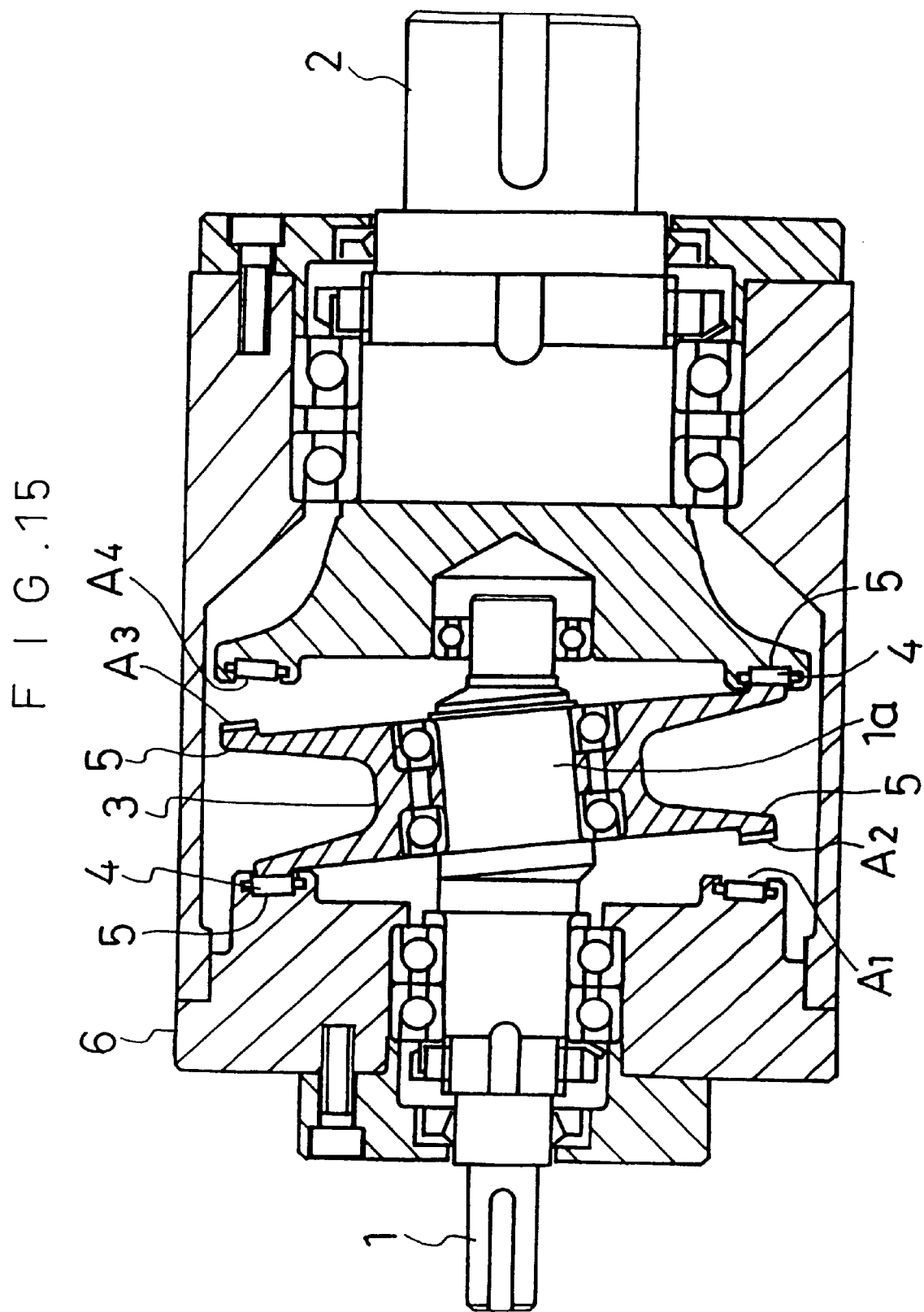

SPEED CHANGE GEAR ASSEMBLY

BACKGROUND OF THE INVENTION

1. Field of Invention

The present invention relates to a differential gear assembly that may obtain a large speed change ratio using four gears.

2. Background of Related Art

Today, an actuator for changing a rotary motion obtained from a rotary drive source such as a motor into a linear motion has been used in various kinds of mechanical devices. In general, the actuator decelerates a rotation of a rotary shaft through a speed change gear assembly and changes it into the linear motion under a condition that a greater drive torque or a higher rotation is obtained. Accordingly, the speed change gear assembly is one of the important constituent elements of the actuator. Conventionally, in general, involute gears have been assembled for the speed change gear assembly. However, a backlash is inevitable in the assembly such as cycloid gears, involute gears and the like. In case of the actuator which requires a high positional precision, an influence of the backlash is large to degrade the positional precision.

Therefore, the present inventor has invented a speed change assembly that may obtain a large speed change ratio without an inevitable backlash and disclosed its detail in the Japanese Patent Publication No. Hei 7-56324. Since gears used in the interior of the speed change assembly employ a so-called Coriolis motion, the speed change assembly will be referred to as a Coriolis gear assembly. FIG. 15 shows a sectional side view of the primary part of the Coriolis gear assembly by the present inventor. In the Coriolis gear assembly, an input gear shaft 1 and an output gear shaft 2 are connected to each other through first to fourth gears A₁ to A₄. The speed reduction is realized by these gears. The first to fourth gears $A_1$ to $A_4$ are bevel gears. Then, the second gear $A_2$ and the third gear $A_3$ are provided on a rotary member 3. The rotary member 3 is pivoted on a slant portion 1a of the input shaft 1. If the rotary member 3 is thus supported obliquely, it is possible to generate a Coriolis motion, to be described later, of the rotary member 3 in accordance with a rotation of the input shaft 1.

Also, rollers 4 and inscribed surfaces 5 are used as gear teeth of each gear so that the rotation of the rollers 4 may absorb a sliding motion generated in the cogged engagement. Accordingly, even if the setting of the backlash is omitted and a pre-pressure is intentionally applied to the gears, it is possible to avoid heat generation caused by the engagement of the gears. In addition, a cross-sectional shape of the rotary member 3 is formed into a U-shape so that portions forming the U-shape may be resiliently deformed to impart the pre-pressure by their resiliency. Then, when the rotary motion of the input shaft 1 is transmitted to the output shaft 2, a two-stage speed reduction effect is attained by the first and second gears $A_1$ and $A_2$ and the third and fourth gears $A_3$ and $A_4$.

By the way, when the rotary motion of the input shaft is transmitted to the output shaft, the conventional planetary gear assembly (for example, S-C-P type, where S is the sun gear, C is the carrier and P is the planetary gear) is subjected to an one-stage speed reduction effect only. The speed reduction ratio that may be designed is limited. In view of this fact, it is understood that the Coriolis gear assembly presented by the present inventor may be designed to have a greater speed reduction ratio in a wider range and may be applied more broadly. It is an object of the present invention is to aim at further broadening an application range of the Coriolis gear assembly by making possible the forms of the Coriolis gear diversified while utilizing the above-described advantages of the Coriolis gear.

SUMMARY OF THE INVENTION

In order to solve the above-described problem, according to an invention of claim 1, there is provided a speed change gear assembly in which the respective axes of the first gear having a tooth number $N_1$ fixed to a housing and the fourth gear having a tooth number $N_4$ mounted on an output shaft are made in accordance with each other relative to the axis of the input shaft, and a rotary member provided integrally with the second gear having a tooth number $N_2$ and the third gear having a tooth number $N_3$ are supported rotatably on a slant portion of the input shaft so that the second gear is engaged with the first gear and the third gear is engaged with the fourth gear, characterized in that:

a center of a common spherical surface passing through each pitch circle of the first and second gears is made in accordance with a center of a common spherical surface passing through each pitch circle of the fourth and third gears, the axis of the input shaft is disposed on an X-axis of a coordinate XY having an origin at the center, and an engagement point between the first and second gears and an engagement point between the fourth and third gears are always disposed in such a manner that the engagement points are positioned in the same quadrant of the XY coordinate when rotated around the X-axis; and an angle defined by the input shaft and its slant portion is θ, an angle between a plane perpendicular to a rolling surface of each gear and a centerline of each pitch cone is $\theta_1$ to $\theta_4$ for each of the first to fourth gears with a relationship of $\theta_1+\theta_2=\theta_3+\theta_4=\theta$, an equal altitude tooth is formed on either side of facing rolling surfaces by a cutter having the respective any tooth forms of the first to fourth gears obtained on the assumption of corresponding cylindrical gears each having a corresponding tooth number $Z_1$, $Z_2$, $Z_3$ and $Z_4$ given:

$Z_1 = N_1/\sin\theta_1$ $Z_2 = N_2/\sin\theta_2$ $Z_3 = N_3/\sin\theta_3$ $Z_4 = N_4/\sin\theta_4$ with a corresponding pitch radius being a distance from the rolling surface of each gear to an intersection between a plane perpendicular to the rolling surface and a centerline of each pitch cone, and the tooth form of the equal altitude tooth is generated and transferred on the associated surface.

According to the present invention, the center of the common spherical surface passing through each pitch circle of the first and second gears is made in accordance with the center of the common spherical surface passing through each pitch circle of the fourth and third gears, the axis line of the input shaft is arranged on the X-axis of the XY coordinate having the origin at the center, and the engagement point between the first and second gears and the engagement point of the fourth and third gears are arranged in the same quadrant of the XY coordinate. As a result, it is possible to arrange the first to fourth gears in the same axial direction surface of the rotary member to thereby reduce the axial directional dimension of the gear assembly.

Also, according to an invention of claim 2, the engagement point between the first and second gears and the engagement point between the third and fourth gears may be disposed in the first quadrant and the second quadrant or the third quadrant and the fourth quadrant, respectively, instead of disposing the engagement point between the first and second gears and the engagement point between the third and fourth gears in the same quadrant of the XY coordinate. Also with this arrangement, it is possible to arrange the first to fourth gears in the same axial directional surface of the rotary member and to reduce the axial directional dimension of the gear assembly.

Furthermore, according to an invention of claim 3, the respective gears may be bevel gears, spiral bevel gears or skew bevel gears.

Also, according to an invention of claim 4, the respective gears are defined by rollers and inscribed surfaces. As a result, even if the design for the backlash is dispensed with and a suitable pre-pressure is applied to the teeth, the sliding motion generated upon an engagement of the gears may be absorbed by a rotation of the rollers.

Furthermore, according to an invention of claim 5, the input shaft and the output shaft are hollow. The space of the interior of the input and output shafts may be used as, for example, a through-passage passing through the speed change assembly.

Also, a machining process for teeth of a speed change gear assembly according to an invention of claim 6 is characterized in that a workpiece is fixed to a motion system for performing the same motion as a Coriolis motion which is required for gears, a cutter having any desired tooth form is moved in a predetermined tooth line direction in synchronism with the Coriolis motion of the motion system, and teeth of the gears used in the speed change gear assembly recited in any one of the claims 1–5 are generated in the workpiece.

According to the present invention, the teeth are generated in the same motion as the Coriolis motion which is required when the workpiece is used as a gear whereby a cutter having any desired tooth form is brought into contact with the workpiece as if the gear that forms one of a pair with the workpiece would engage with the workpiece. Thus, any desired tooth form may be formed.

Furthermore, according to a speed change gear assembly according to an invention of claim 7, the speed change gear assembly has gears formed by a hot die-cast method, a cold pressing method or a resin molding pressing method with molds to which the tooth form formed by the machining process for the teeth according to the invention of claim 6 has been transferred.

BRIEF DESCRIPTION OF THE DRAWINGS

In the accompanying drawings:

FIG. 14 is an enlarged cross-sectional view showing a further modification of a tooth form used in the fifth embodiment of the present invention;

FIG. 15 is a cross-sectional view showing a conventional speed change gear assembly;

DETAILED DESCRIPTION OF THE PREFERRED EMBODIMENTS

As an example, hereinafter a speed reduction gear assembly is illustrated. An embodiment of the present invention will now be described with reference to the accompanying drawings.

Figure 16A:
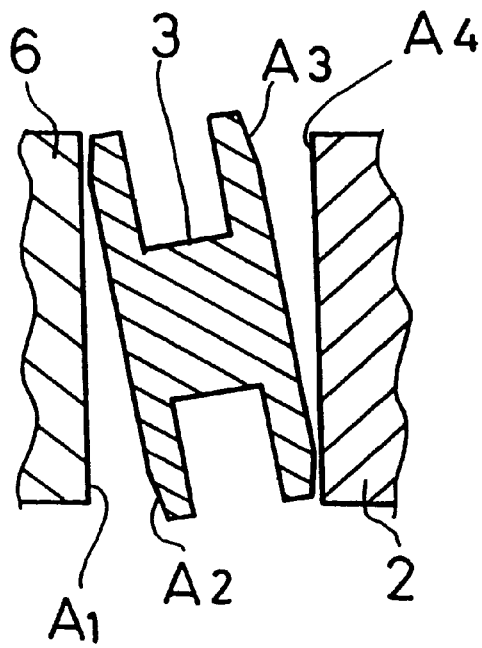
FIGS. 16A–16B are schematic cross-sectional views showing a situation of differential operation of the speed change gear assembly shown in FIG. 15.
Figure 16B:
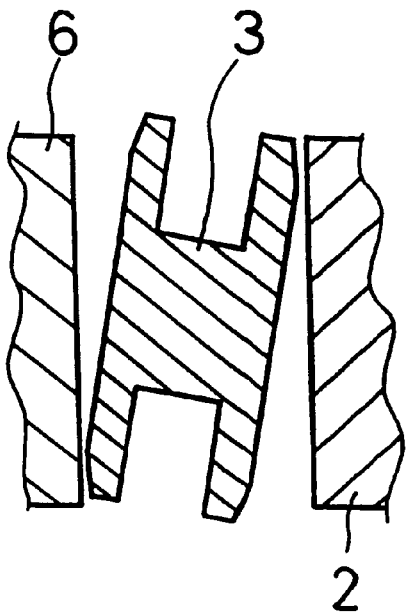
Figure 17:
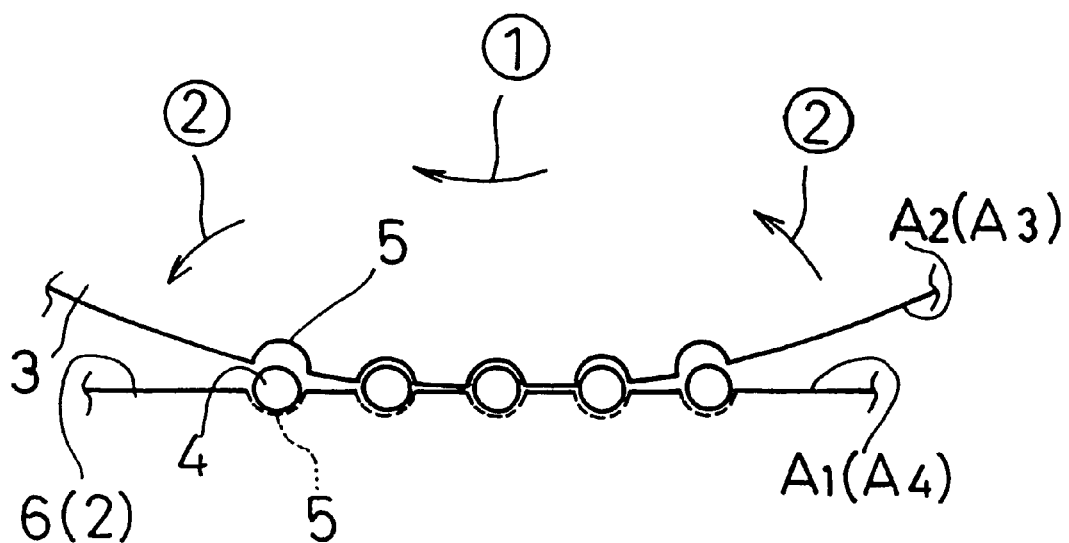
FIG. 17 is a schematic frontal view showing a situation of the differential operation of the speed change gear assembly shown in FIG. 15.

A principle of a Coriolis gear assembly will first be described with reference to FIGS. 15 to 17. As shown in FIG. 15, the Coriolis gear assembly has the first to fourth gears $A_1$ to $A_4$ as four gears having different numbers of teeth. In these gears, the first gear $A_1$ is integrally fixed to a housing 6 and is a stationary gear which is not rotated. The second gear $A_2$ and the third gear $A_3$ are formed on a rotary member 3 rotatably supported to an input gear 1. Also, the fourth gear $A_4$ is provided on an output shaft 2 and is rotatably supported to the housing 6. Then, the first gear $A_1$ and the second gear $A_2$, and the third gear $A_3$ and the fourth gears $A_4$ are engaged with each other, respectively.

The rotary member 3 is supported by a slant portion la having a predetermined angle relative to an axis of the input shaft 1. The input shaft 1 per se is rotatably supported to the housing 6. When the input shaft 1 is rotated, the slant portion la takes a motion like a swinging neck. The rotary member 3 rotatably supported to the input shaft 1 takes a swinging motion like a spinning top just before stopping. The motion of the rotary member 3 is referred to as a Coriolis motion. Then, the rotary member 3 takes the Coriolis motion $A_2$ to thereby cause the second gear $A_2$ to engage with the first gear $A_1$ and the third gear As to engage with the fourth gear $A_4$, respectively (see FIGS. 16(*a*) and 16(*b*)). Then, the second gear $A_2$ is rotated relative to the first gear $A_1$ corresponding to the difference in tooth number between the second gear $A_2$ and the first gear Al per one cycle of the Coriolis motion (one turn of the input shaft 1). Namely, the one-stage speed reduction is attained between the second gear $A_2$ and the first gear $A_1$.

Here, the following case is an assumption in the case where the tooth number of the first gear $A_1$ is 100 and the tooth number of the second gear $A_2$ is 101. When the input shaft 1 is rotated forwardly through one turn, the second gear $A_1$ is rotated forwardly by $\frac{1}{100}$ relative to the first gear $A_2$ is 99. Also, assuming that the tooth number of the first gear $A_1$ is 100 and the tooth number of the second gear $A_2$, the second gear $A_1$ is rotated reversely by $\frac{1}{100}$ relative to the first gear $A_2$. The motion of the second gear $A_2$ is directly transmitted to the third gear $A_3$, and the third gear $A_3$ and the fourth gear $A_4$ are engaged with each other in the same manner. Accordingly, the one-stage speed reduction is attained between the third gear $A_3$ and the fourth gear $A_4$. Namely, while the rotary motion of the input shaft 1 is being transmitted to the output shaft 2, the two-stage speed reduction effect is attained by the first and second gears $A_1$ and $A_2$ and the third and fourth gears $A_3$ and $A_4$.

Assuming that the speed reduction ratio of the above-described Coriolis gear assembly (RPM of the output shaft 2 when the input shaft 1 is rotated through one turn) is R, the equation is given as follows:

$$R = 1 - (N_4 \times N_2)/(N_3 \times N_1) \qquad (i)$$

where $N_1$ is the tooth number of the first gear $A_1$, $N_2$ is the tooth number of the second gear $A_2$, $N_3$ is the tooth number of the third gear $A_3$, and $N_4$ is the tooth number of the fourth gear $A_4$.

In this case, assuming that $N_1=1000$, $N_2=999$, $N_3=1000$ and $N_4=1001$, the speed reduction ratio R is one millionth (forward rotation). Thus, the Coriolis gear assembly may attain a large speed reduction ratio only with four gears.

Also, when the second gear $A_2$ and the third gear $A_3$ are engaged with the first gear $A_1$ and the fourth gear $A_4$, while taking the Coriolis motion, a sliding motion is generated between the respective engagement surfaces. In order to avoid a noise and vibration due to the sliding motion and a sticking caused by the heat generation due to the sliding motion, as shown in FIGS. 15 and 17, rollers 4 nd inscribed surfaces 5 with the rollers, that is, the inscribed surfaces 5 are complementary to the rollers 4, are formed in the teeth of each gears. More specifically, as shown in FIG. 17, the rollers 4 are floatably supported to the inscribed surfaces 5, with the rollers, formed on the first gear A, (fourth gear $A_4$) to form semicircular sleeve-like convex teeth. Also, the inscribed surfaces 5, with the rollers, are formed in the second gear $A_2$ (third gear $A_3$) to form semicircular sleeve-like concave teeth. Then, when the rotary member 3 takes the Coriolis motion in a direction indicated by an arrow ①, the second gear $A_2$ (third gear $A_3$) is moved in a direction indicated by arrows ② so that the respective convex and concave teeth are engaged with each other. Then, the sliding motion generated between the respective convex and concave teeth is absorbed by the rotation of the rollers 4. (This is partly excerpted from NIKKEI MECHANICAL, Oct. 28, 1996, No. 492.) Accordingly, not only the design of the backlash is unnecessary but also the pre-pressure is given in between the respective gears to perform the engagement with high precision.

Incidentally, as described above, in the case where the difference in tooth number between the first gear $A_1$ and the second gear $A_2$ is one, when the Coriolis motion is performed by one cycle, the teeth to be engaged between the first gear $A_1$ and the second gear $A_2$ is displaced by one. Also, in the case where the tooth number difference is two, when the Coriolis motion is performed by one cycle, the teeth to be engaged between the first gear $A_1$ and the second gear $A_2$ is displaced by two. In the same manner, in the case where the tooth number difference is N, the teeth to be engaged is displaced by N. This is the case also in the relationship between the third and fourth gears $A_3$ and $A_4$.

Figure 1:
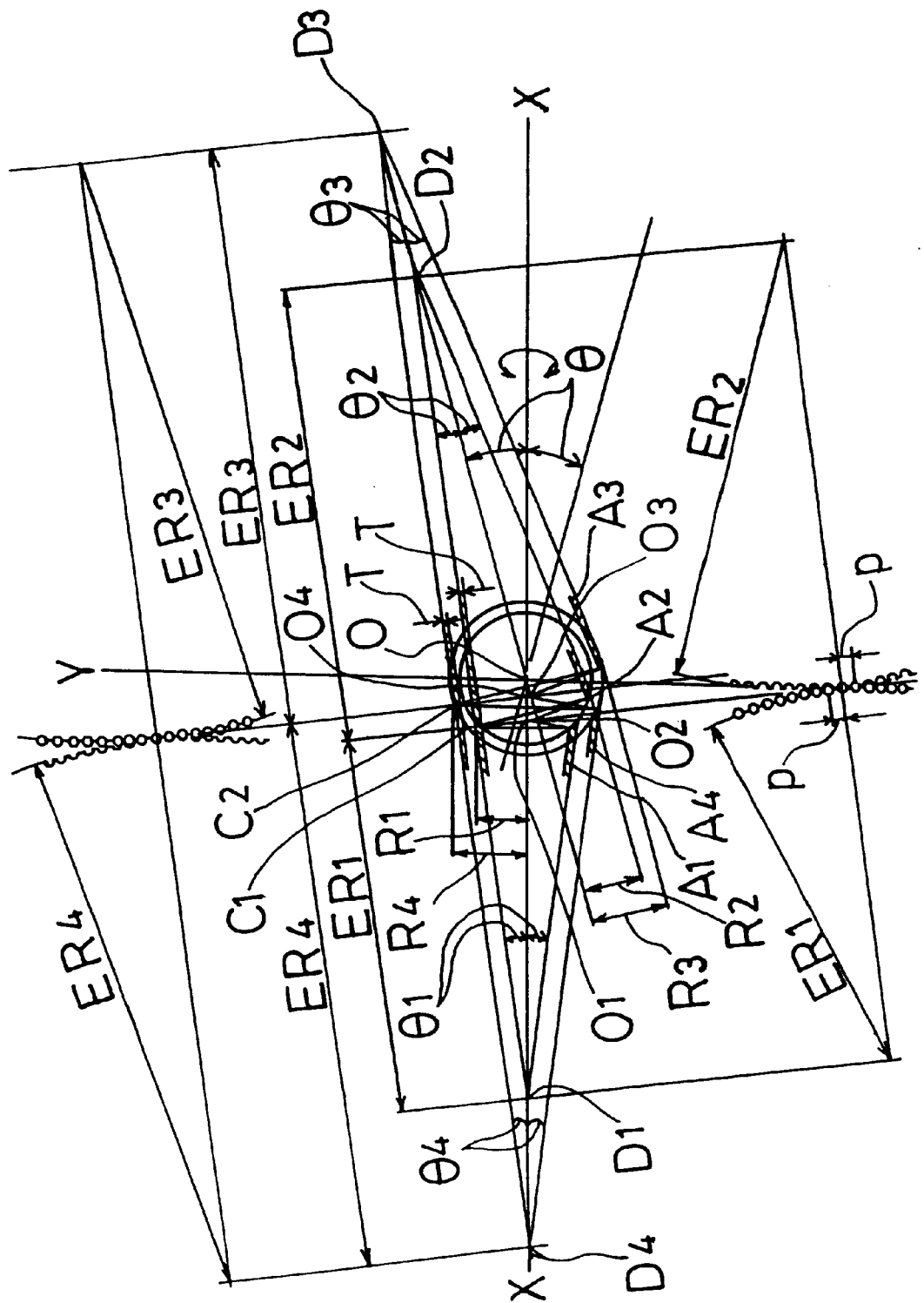
FIG. 1 is a developed view showing a method of obtaining a tooth form of each bevel gear in a speed change gear assembly according to the first embodiment.
Figure 2:
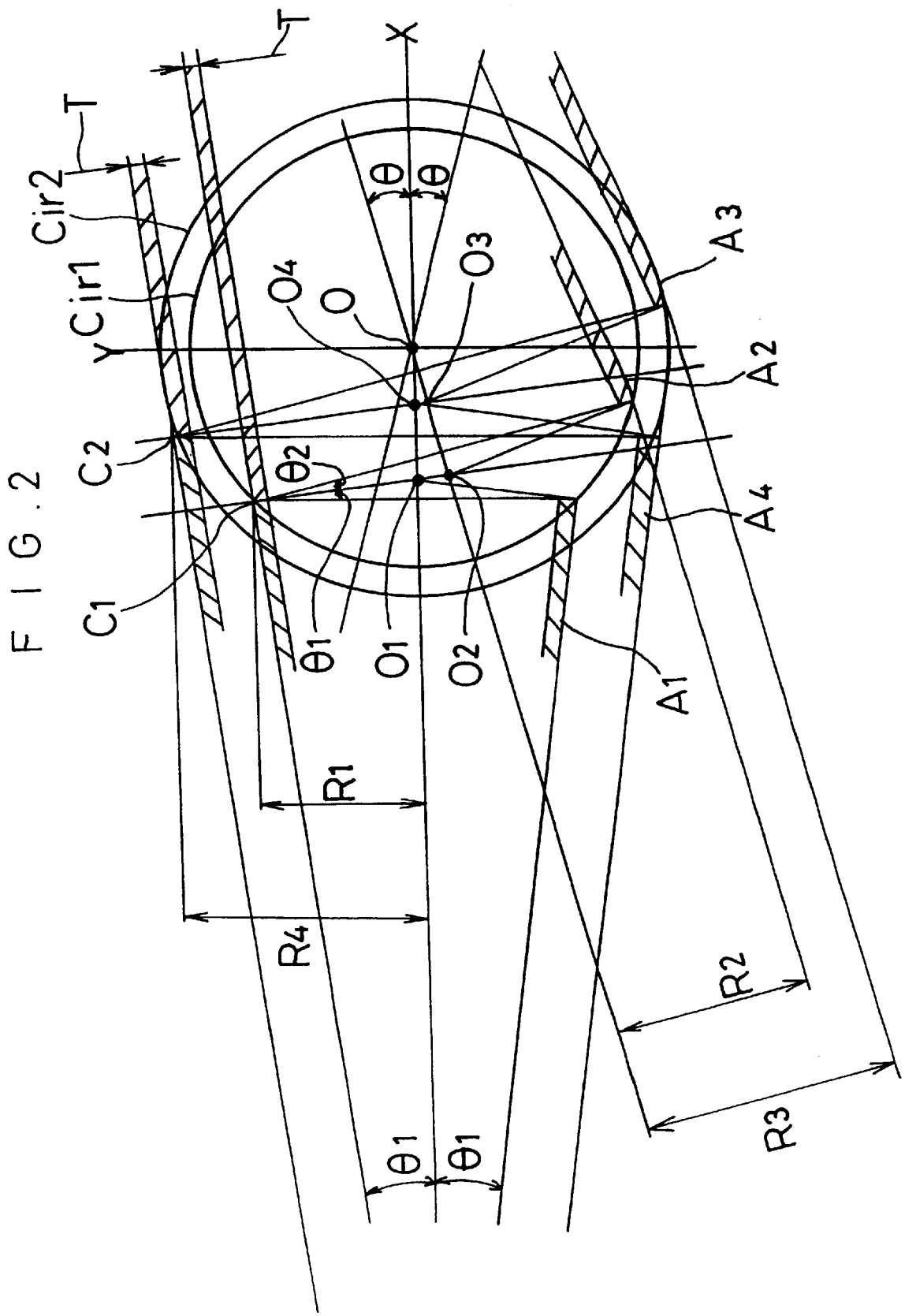
FIG. 2 is an enlarged view of a primary part of FIG. 1.
Figure 7:
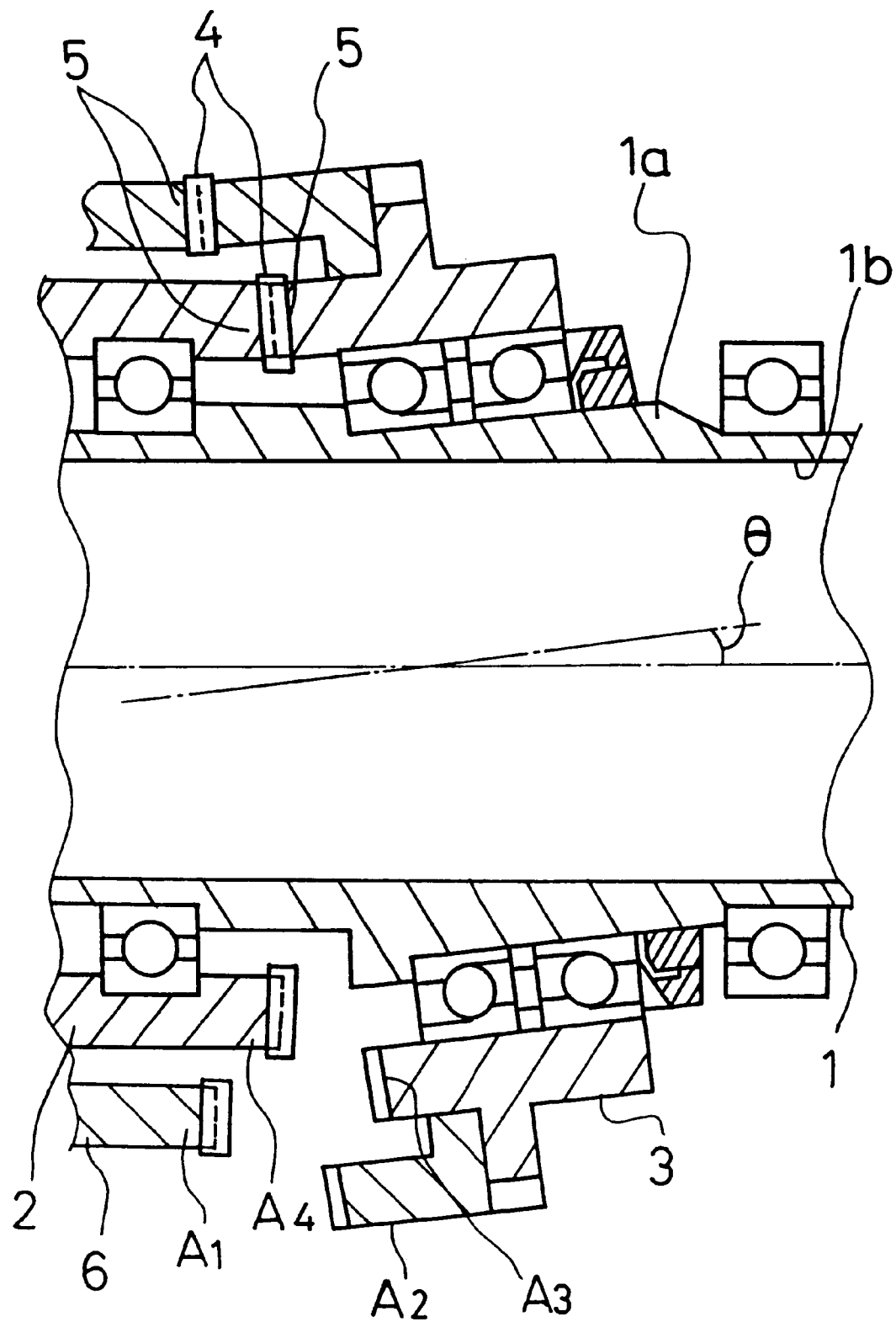
FIG. 7 is a schematic cross-sectional view showing the speed change gear assembly in accordance with the first embodiment of the invention.

A speed change gear assembly in accordance with a first embodiment of the present invention, which is an example of the application of the above-described Coriolis gear assembly, will now be described with reference to FIGS. 1, 2 and 7. FIG. 1 is a developed view showing a method of obtaining a tooth form of each bevel gear in the gear assembly according to the present embodiment. FIG. 2 is an enlarged view of the primary part of FIG. 1. FIG. 7 is a schematic cross-sectional view showing the speed change gear assembly obtained by the method of FIGS. 1 and 2, showing only a part different from that of the Coriolis gear assembly shown in FIG. 15. Also, in this embodiment, the same reference numerals are used to indicate the same parts as and the like parts of the conventional example, and the detailed explanation therefor will be omitted.

As shown in FIG. 7, the first bevel gear $A_1$ is fixed to the housing 6. Also, the fourth bevel gear $A_4$ is mounted on the output shaft 2. The second and third bevel gears $A_2$ and $A_3$ provided on the rotary member 3 are provided on the same axial direction surface of the rotary member 3 (on the left side surface of the rotary member 3 in FIG. 7). Accordingly, when the respective gears are engaged with each other, the first, second, fourth and third gears are arranged in this order in the axial direction of the input gear 1. The input shaft 1 is provided to pass through a hollow portion of the output shaft 2. Also, the input shaft 1 is formed as a hollow shaft which is used as a through-passage 1b.

As shown in FIGS. 1 and 2, the center point of a common spherical surface Cir1 (FIG. 2) passing through each pitch circle of the first bevel gear $A_1$ and the second bevel gear $A_2$ is made in accordance with the center point of a common spherical surface Cir2 (FIG. 2) passing through each pitch circle of the third bevel gear $A_3$ and the fourth bevel gear $A_4$. The identified center point is referred to by O. Then, the XY coordinate having the origin O is set up. The center axis of the input shaft 1 (FIG. 7) is disposed on an X-axis of the XY coordinate. Then, the engagement point between the first and second bevel gears A, and $A_2$ and the engagement point between the third and fourth bevel gears As and $A_4$ are referred to as $C_1$ and $C_2$. In the embodiment, both engagement points $C_1$ and $C_2$ are arranged in the second quadrant (or the third quadrant) of the XY coordinate. For reference, in the conventional Coriolis gear assembly shown in FIG. 15, the above-described engagement points are separated in the first quadrant and the third quadrant or the second quadrant and the fourth quadrant.

An angle defined between the center axis direction of the input shaft 1 and a slant portion la is referred to as θ. Angles defined between planes perpendicular to the rolling surfaces of the first and second gears $A_1$ and $A_2$ and center lines of the respective pitch cones are $\theta_1$ for the first gear and 0 2 for the second gear and $\theta_1 + \theta_2 = \theta$. It is possible to select zero for either $\theta_1$ or $\theta_2$. In this case, the bevel gear having this angle of zero is a crown gear. In the same way, angles defined between planes perpendicular to the rolling surfaces of the third and fourth gears $A_3$ and $A_4$ and center lines of the respective pitch cones are $\theta_3$ for the third gear and $\theta_4$ for the fourth gear and $\theta_3 + \theta_4 = \theta$.

Also, the tooth numbers of the first through fourth bevel gears are $N_1$, $N_2$, $N_{23}$ and $N_4$ and the values of $N_1$ and $N_2$ are different from each other and the values of $N_3$ and $N_4$ are different from each other. Assume cylindrical gears $ER_1$, $ER_2$, $ER_3$ and $ER_4$ having radii of pitch circles distances $D_1O_1$, $D_2O_2$, $D_3O_3$ and $D_4O_4$ from the intersections between planes perpendicular to the rolling surfaces of the first to fourth gears $A_1$ to $A_4$ and the centerlines of the respective pitch cones to the apexes of the respective pitch cones. Then, assume an involute tooth form of the same circle pitch or any desired tooth form on the pitch circles. This tooth form are used to corresponding cylindrical gears of the first to fourth gears $A_1$ to $A_4$. Here, assuming that the corresponding tooth numbers of the corresponding cylindrical gears are $Z_1$, $Z_2$, $Z_3$ and $Z_4$, these are expressed as follows:

$$Z_1 = N_1/\sin\theta_1 \quad \text{(ii)}$$

$$Z_2 = N_2/\sin\theta_2 \quad \text{(iii)}$$

$$Z_3 = N_3/\sin\theta_3 \quad \text{(iv)}$$

$$Z_4 = N_4/\sin\theta_4 \quad \text{(V)}$$

In the corresponding cylindrical gears having the relationship obtained by the above-described equations (ii) and (iii), a tooth form having an equal altitude (octoid tooth form) is generated on the first gear $A_1$ by a cutter for forming an involute tooth form or any desired tooth form. Furthermore, the tooth form is transferred to the second gear $A_2$. In the same way, the third and fourth gears $A_3$ and $A_4$ are formed. Furthermore, if the inscribed surface 5 with the roller is formed instead of the above-described octoid tooth form, it is possible to obtain almost the same tooth form as that shown in FIG. 15 and FIG. 17. FIG. 7 shows the case where the rollers 4 and the inscribed surfaces 5 with the rollers are used as the tooth form. Incidentally, the rollers used here may be substituted by any type rollers such as cylindrical rollers and needle-like rollers.

The advantageous result obtained by the first embodiment of the present invention with the above-described arrangement is as follows. In accordance with the embodiment, both the engagement point $C_1$ between the first and second bevel gears $A_1$ and $A_2$ and the engagement point $C_2$ between the third and fourth bevel gears $A_3$ and $A_4$ are located in the second quadrant (or third quadrant) of the above-described XY coordinate, whereby as shown in FIG. 7, the first to fourth bevel gears are located in the same axial direction surface of the rotary member 3 to thereby decrease an axial directional dimension of the gear assembly. Also, it is easy to locate the output shaft 2 so as to extend in the same direction as that of the input shaft 1, and it is possible to cope with various requirements. Accordingly, it is possible to broaden the application range of the Coriolis gear assembly that may obtain the large speed reduction ratio only with the four gear.

Also, as shown in FIG. 7, the output shaft 2 is formed as a hollow shaft, the input shaft 1 is provided to pass through the interior of the hollow shaft, and the input shaft 1 is also formed as a hollow shaft to make the hollow interior as a through-passage 1b. Accordingly, it is possible to dispose various parts in the interior of the through-passage 1b. For example, in the case where the speed change gear assembly is used as a swivelling drive means for a gun turret, the through-passage may be formed as a bullet feeding passage to the gun or a communication passage for the operators. The assembly is suitable particularly to a system that needs a ultra-precise rotation and stop motion and at the same time needs a rotatable hollow pipe such as a turntable of a large size machine tool, a large size crane, a multi-articulated robotic arm, turrets for bases of the crane and the robotic arm, a base seat for a parabola antenna, a rotary device for a human body CT scanner and the like.

Figure 3:
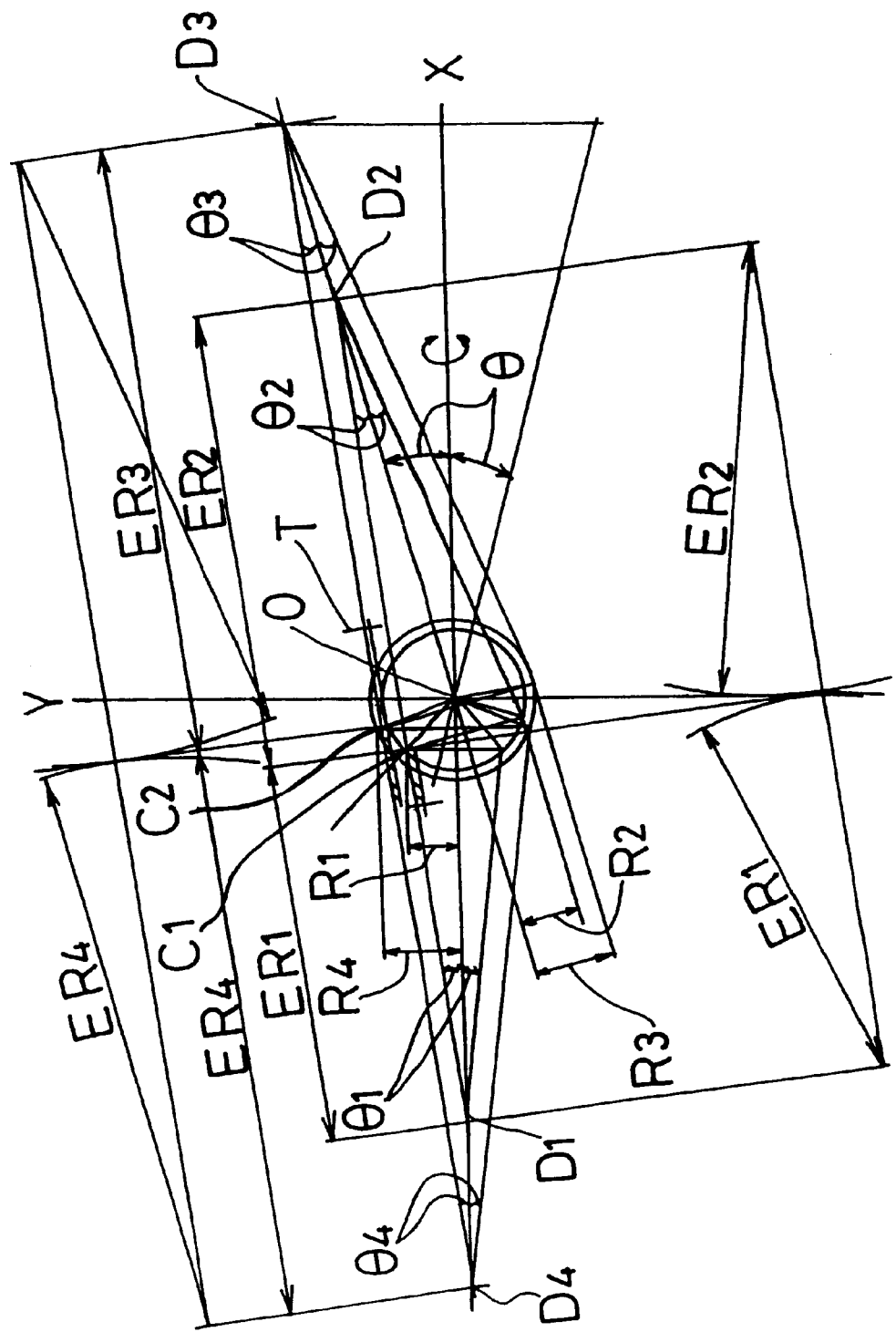
FIG. 3 is a developed view showing a method for obtaining a tooth form of each bevel gear in a speed change gear assembly in accordance with the second embodiment.
Figure 5:
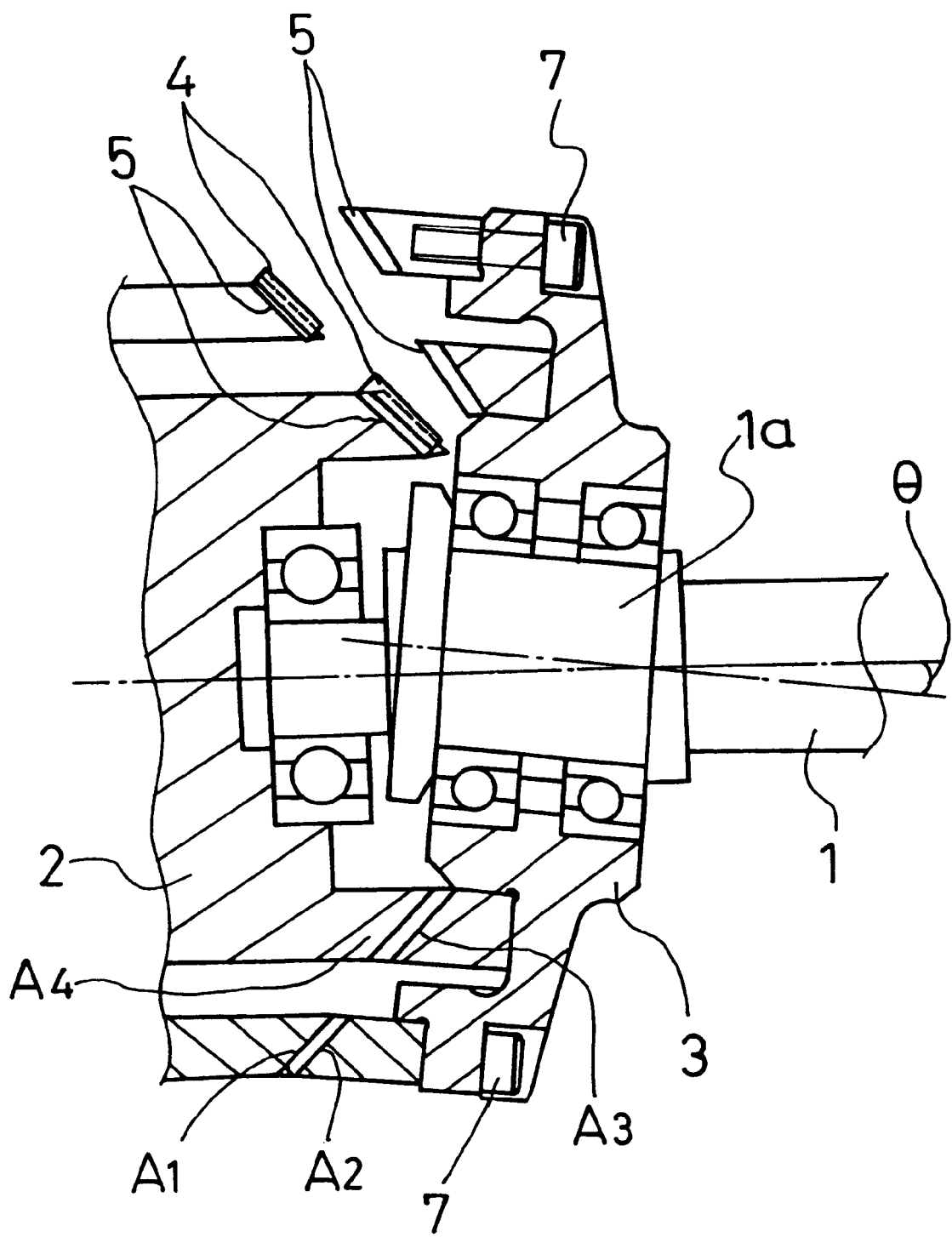
FIG. 5 is a schematic cross-sectional view of the speed change gear assembly in accordance with the second embodiment of the invention.

A speed change gear assembly in accordance with a second embodiment of the present invention will now be described with reference to FIGS. 3, 5 and 6. FIG. 3 is a developed view showing a method for obtaining a tooth form of each bevel gear in a gear assembly in accordance with the second embodiment. FIG. 5 is a schematic cross-sectional view of a speed change gear assembly obtained by the method shown in FIG. 3, showing only a part different from that of the speed change gear assembly shown in FIG. 15. In the second embodiment, the same reference numerals are used to indicate the same parts as and the like parts of the conventional example, and the detailed explanation therefor will be omitted.

The different point between the first and second embodiments of the invention is that, in the second embodiment, the rolling surface of each bevel gear, i.e., the tooth line direction is directed to the origin O of the XY axes. According to this method, as shown in FIG. 5, the second gear $A_2$ and the third gear $A_3$ are formed as inner tooth bevel gears (reverse conical bevel gears) having an equal altitude. Also in this embodiment, both the engagement point $C_1$ between the first and second bevel gears $A_1$ and $A_2$ and the engagement point $C_2$ between the third and fourth bevel gears $A_3$ and $A_4$ are located in the second quadrant (or third quadrant) of the XY coordinate shown in FIG. 3, whereby as shown in FIG. 5, the first to fourth bevel gears are located in the same axial directional surface of the rotary member 3 to thereby decrease an axial directional dimension of the gear assembly. Accordingly, it is possible to broaden the application range of the Coriolis gear assembly that may obtain the large speed reduction ratio only with the four gear. Also, in this embodiment, the output shaft 2 is formed as a hollow shaft, the input shaft 1 is provided to pass through the interior of the hollow shaft, and the input shaft 1 may be provided to extend in the same axial direction.

By the way, the second gear $A_2$ and the third gear $A_3$ provided on the rotary member 3 are detachably mounted on the rotary member by fastening means such as bolts 7. The rotary member 3 holds the second and third gears $A_2$ and $A_3$ to be resiliently deformable in the mounting portion of the second and third gears $A_2$ and $A_3$. Accordingly, upon the contact between the respective gears, a suitable pre-pressure may be applied in between the gears. Inscribed surfaces 5 with the rollers are formed on the respective rolling surfaces of the first gear $A_1$ and the fourth gear $A_4$, and the rollers 4 are floatably supported by the inscribed surfaces to thereby form semicircular convex teeth. Also, inscribed surfaces 5 with the rollers are formed on the respective rolling surfaces of the second gear $A_2$ and the third gear $A_3$ to thereby form semicircular concave teeth.

Figure 6:
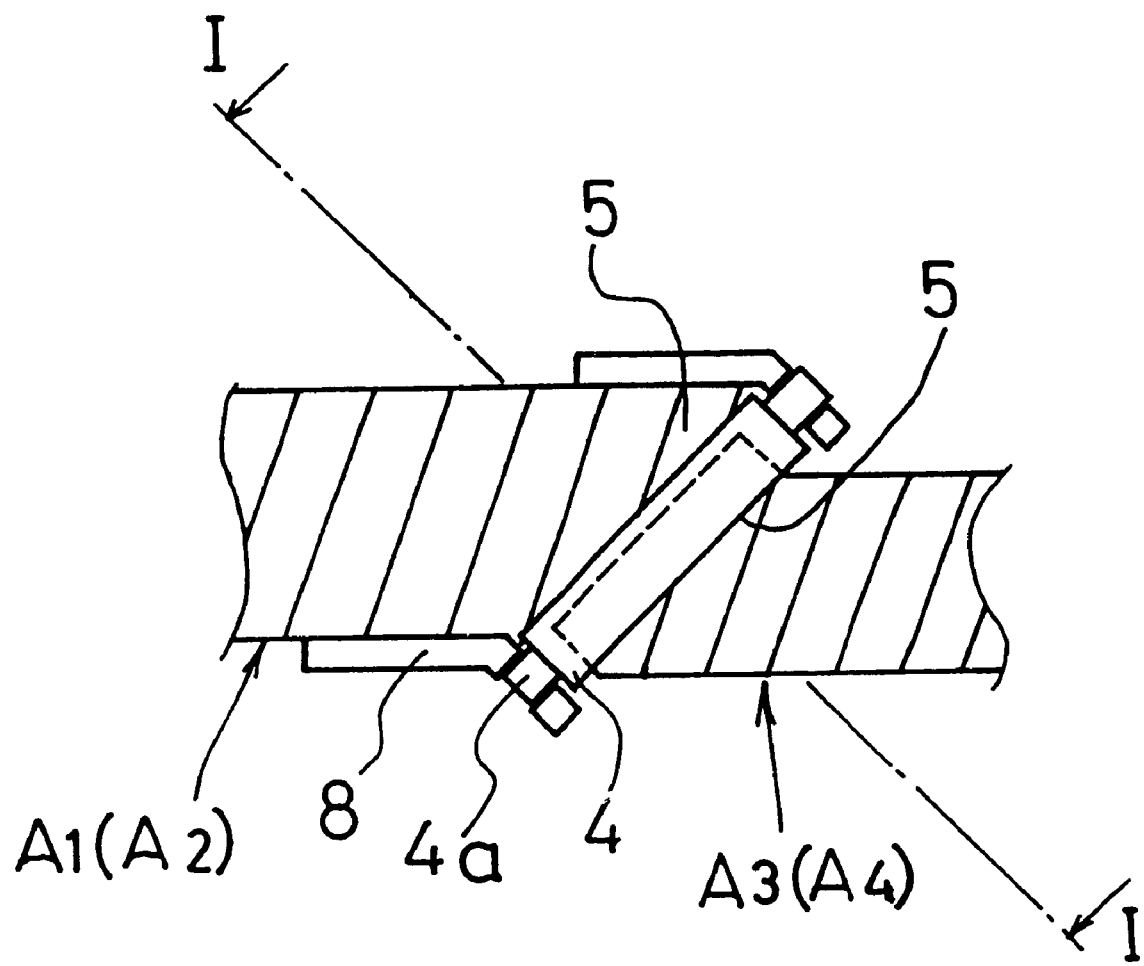
FIG. 6 is an enlarged view showing a part showing an engagement portion between the first and second gears of the speed change gear assembly shown in FIG. 5.

As shown in FIG. 6, the rollers 4 provided on the first and fourth gears $A_1$ and $A_4$ are provided at both ends with small diameter portions 4a which are supported to retainers 8. The retainers 8 are formed material having resiliency such as synthetic resin so as to floatably and rotatably support the rollers 4 (allowing the rollers to slightly move along the inscribed surfaces 5 with the rollers). Then, when a load is applied to the roller 4 (when the gears are engaged with each other), the retainer 8 is deformed only by a necessary amount so that the roller 4 is brought into intimate contact with the inscribed surface 5 with the roller.

Figure 10:
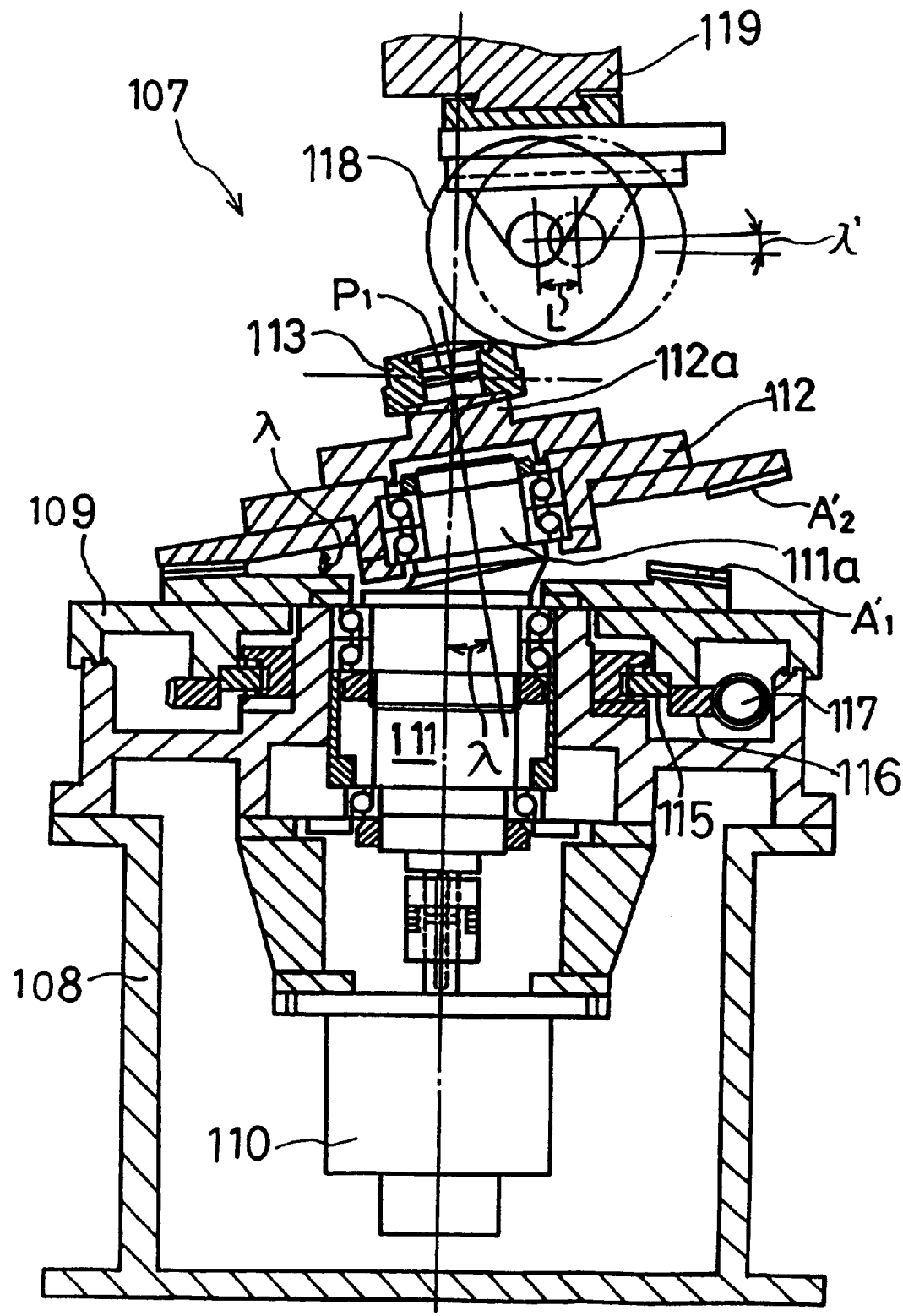
FIG. 10 is a schematic cross-sectional view showing a machining apparatus for forming the bevel gears according to the present invention.

By the way, when the second and third gears $A_2$ and $A_3$ to become the reverse conical bevel gears are manufactured, in particular, when a gear diameter of the second gear $A_2$ is large to some extent (for example, 1–2 m or more), a cutter wheel, with 10 to 20 inches, of a machining apparatus to be explained in conjunction with FIG. 10 may be used. Accordingly, it is possible to form teeth directly by the machining operation. However, in the case where the gear diameter of the second gear $A_2$ is small (for example 20 mm or less), the size of the cutter wheel is one that could not actually be realized. Accordingly, it is difficult to form teeth by the machining operation. Therefore, if a desired tooth form is transferred to a mold (namely, the mold shape being the conical bevel gear) to obtain the gear as a molded product, and the precise machining is effected to the mold, it is easy to produce the gears as the molded products on the mass production basis. Incidentally, of course, the method for obtaining the gears as the molded products is also applicable to the gears which have been explained in the first embodiment.

Figure 4:
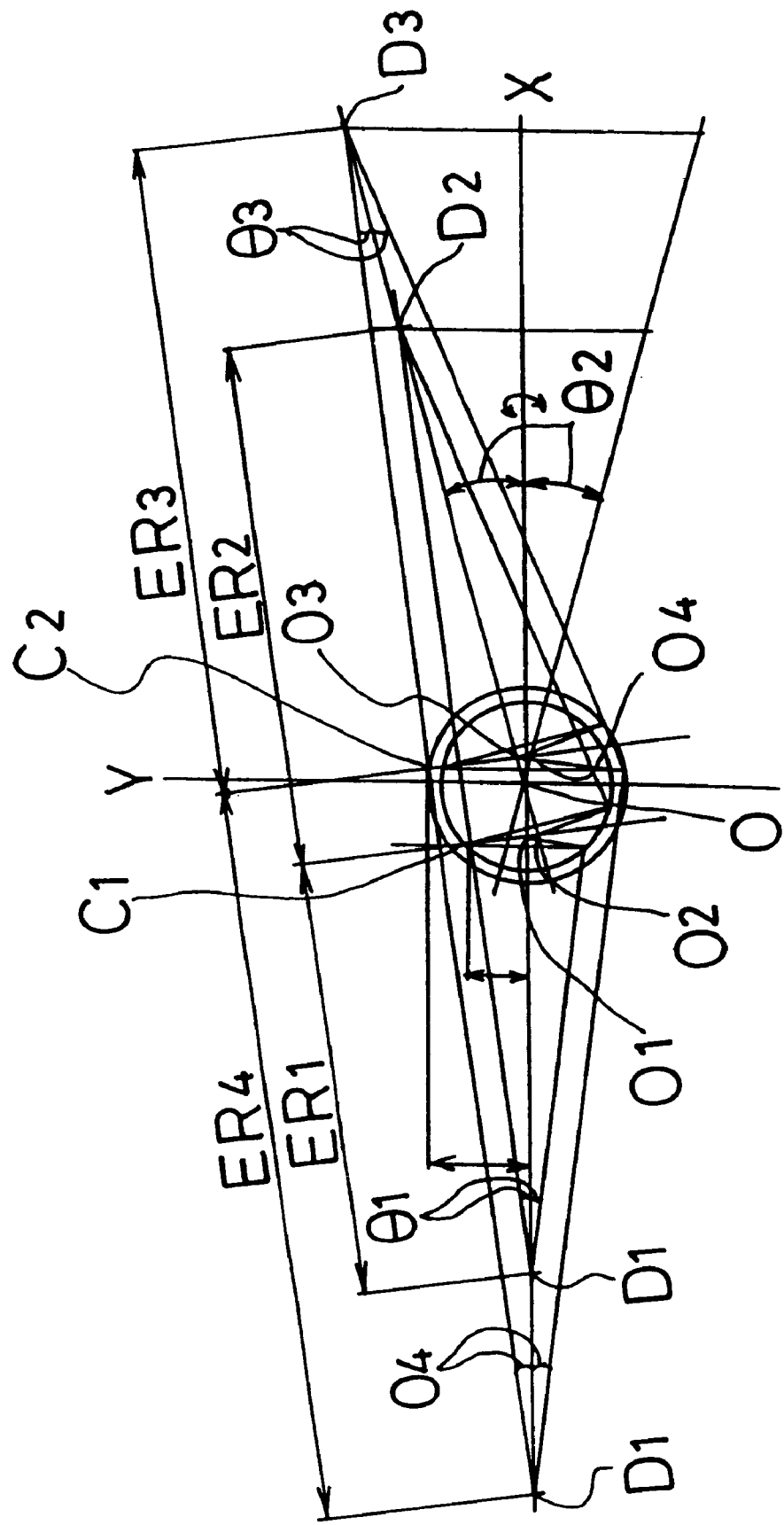
FIG. 4 is a developed view showing a method for obtaining a tooth form of each bevel gear in a gear assembly in accordance with the third embodiment.

A gear assembly in accordance with a third embodiment of the present invention will now be described with reference to FIG. 4. FIG. 4 is a developed view showing a method for obtaining a tooth form of each bevel gear in a gear assembly in accordance with the third embodiment. Also in the third embodiment, the same reference numerals are used to indicate the same parts as and the like parts of the conventional example, and the detailed explanation therefor will be omitted.

In the third embodiment of the present invention, the different point from the first and second embodiments of the invention is that, in the XY coordinate shown in FIG. 4, the engagement point $C_1$ between the first and second bevel gears $A_1$ and $A_2$ is located in the second quadrant, and the engagement point $C_2$ between the third and fourth bevel gears $A_3$ and $A_4$ is located in the first quadrant (or $C_1$ is located in the third quadrant and $C_2$ is located in the fourth quadrant). In this case, the $C_1$ and $C_2$ are located in the two quadrants, respectively, but the $C_1$ and $C_2$ are provided to be close to each other on both sides of the Y-axis so that the axial directional dimension of the gear assembly may be reduced in the same manner as in the above-described two embodiments. Also, On the condition that, when the $C_1$ and $C_2$ are provided to be located on both sides of the Y-axis and close to each other, a pitch circle diameter of each of the first to fourth gears $A_1$ to $A_4$ may be closer to the maximum value. Since the allowable torque for the gears is in proportion to the diameter of the gears, it is possible to form a couple of gears having the allowable torque at the maximum level. Accordingly, there is a further advantage that the freedom of design of the gear assembly is broadened and the application range thereof is widened.

Figure 8:
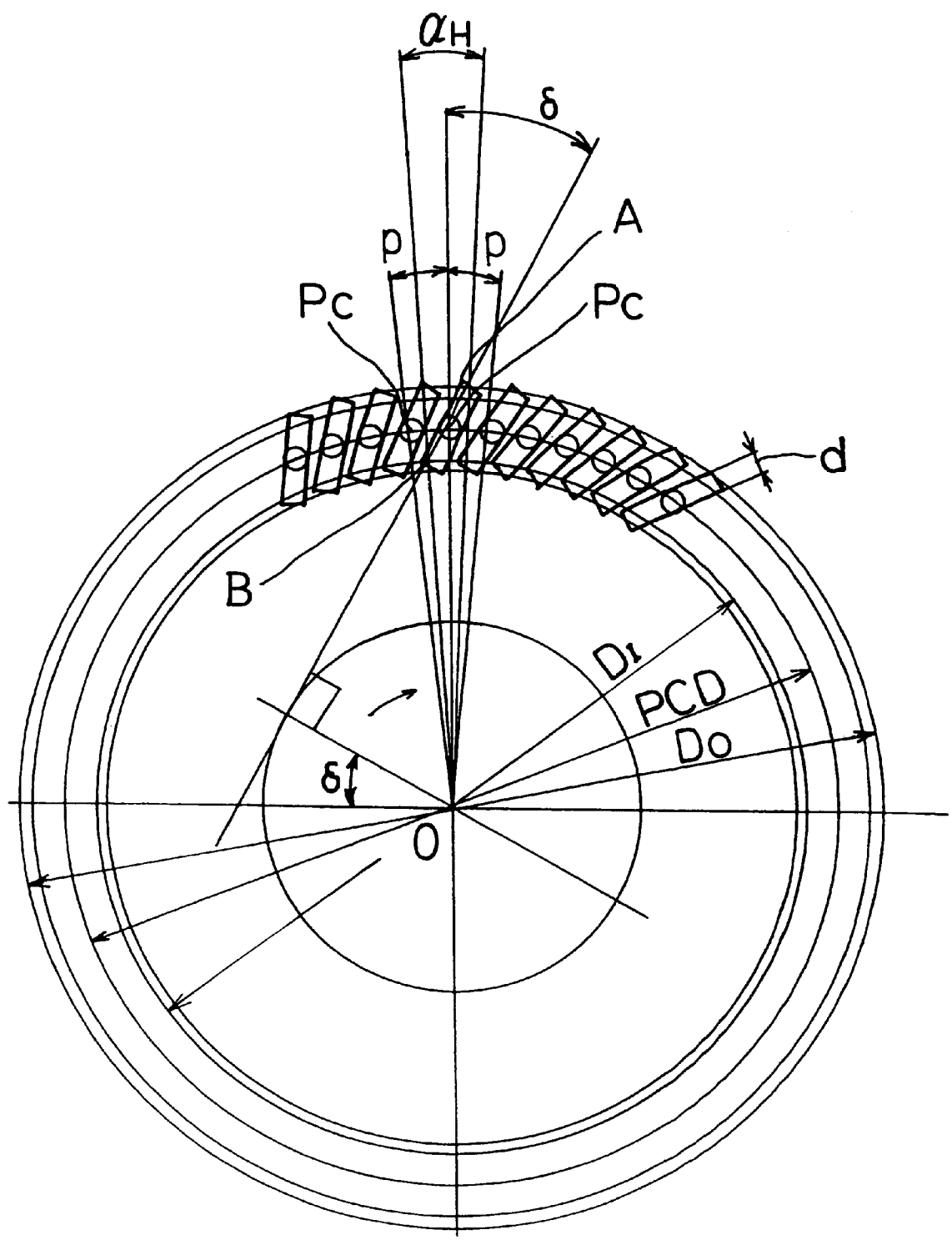
FIG. 8 is a developed view showing a method for obtaining a tooth form of the respective bevel gears in a speed change gear assembly in accordance with the fourth embodiment of the invention.
Figure 9:
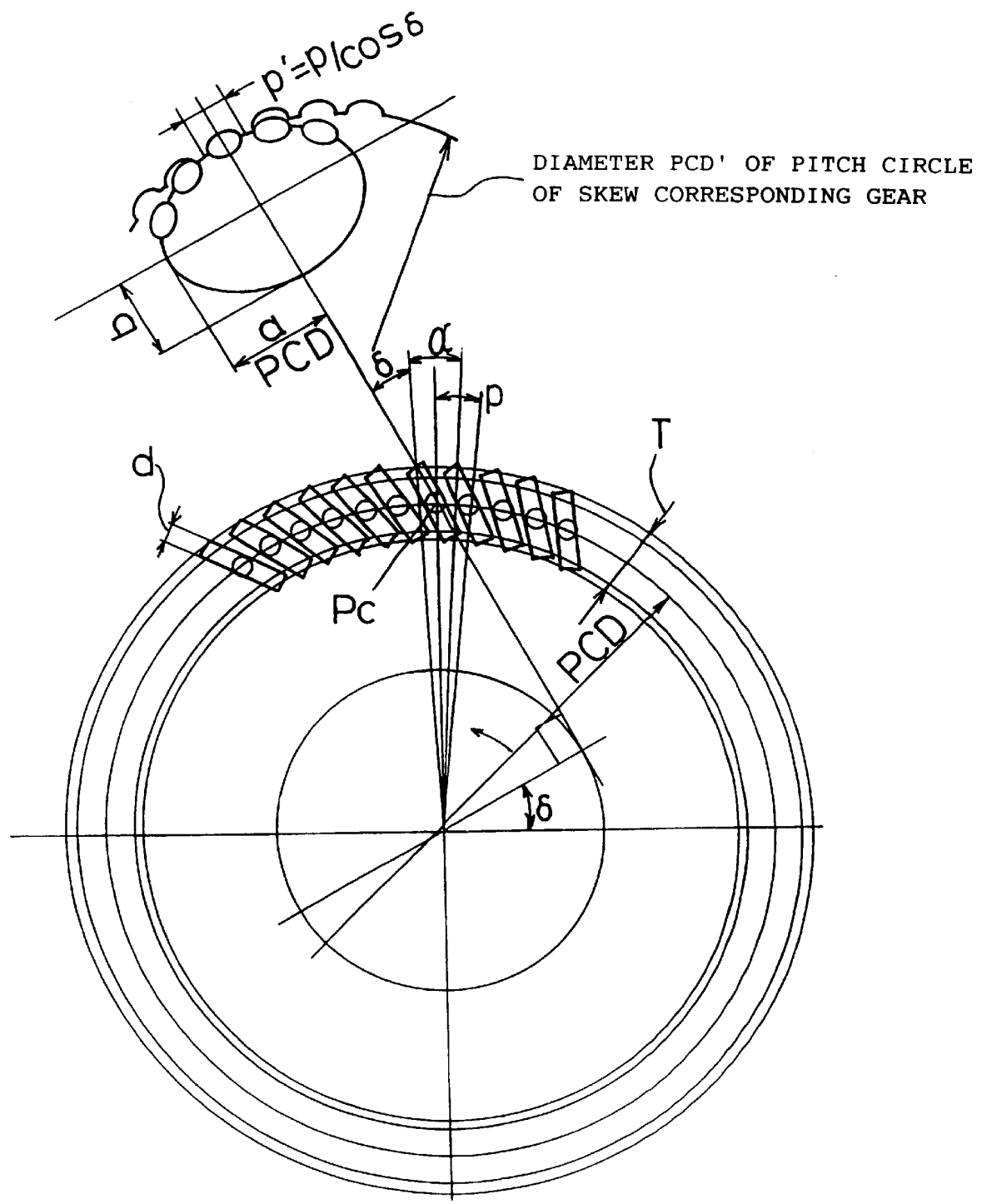
FIG. 9 is a developed view showing a method for obtaining a tooth form of the bevel gear, which is formed as the pair of the respective bevel gears in a speed change gear assembly in accordance with the fourth embodiment of the invention.

A gear assembly in accordance with a fourth embodiment of the present invention will now be described with reference to FIGS. 8 and 9. FIGS. 8 and 9 are developed views showing a method for obtaining a tooth form of each bevel gear in the gear assembly in accordance with the fourth embodiment. Also in the fourth embodiment, the same reference numerals are used to indicate the same parts as and the like parts of the conventional example, and the detailed explanation therefor will be omitted.

This embodiment is characterized in that each bevel gears $A_1$ to $A_4$ is a skew bevel gear. The method for forming the skew is as follows. Referring to FIG. 8:

1. using a circle passing through a center of a teeth width, as a pitch circle diameter (PCD).
2. using an intersection between PCD and a centerline of the tooth to be formed, as Pc.
3. setting a twist angle δ about the center Pc.
4. obtaining a corresponding tooth number of a corresponding spur gear on the assumption that the corresponding spur gear is the spur gear having its diameter which is a curvature radius at the point Pc when the rolling surface is cut by a cross-section perpendicular to the tooth line while passing through Pc.
5. on the basis of the corresponding tooth numbers $Z_1$, $Z_2$, $Z_3$ and $Z_4$ obtained by the foregoing equations (ii) to (v) in the corresponding cylindrical gears, obtaining the tooth numbers $Zh_1$, $Zh_2$, $Zh_3$ and $Zh_4$ of the corresponding spur gear in accordance with the following double corresponding equations:

$$Zh_1 = Z_1/\cos^3 \delta \tag{vi}$$

$$Zh_2 = Z_2/\cos^3 \delta \tag{vii}$$

$$Zh_3 = Z_3/\cos^3 \delta \tag{viii}$$

$$Zh_4 = Z_4/\cos^3 \delta \tag{ix}$$

Incidentally, the above-described double corresponding equations (vi) to (ix) are obtained by a general method when the corresponding tooth number in the corresponding spur gear of the skew gear.

6. It is possible to obtain the skew bevel gear in accordance with the embodiment by providing equal altitude tooth on any one side of the rolling surfaces facing each other by a cutter having each involute tooth form or any tooth form obtained in the corresponding spur gear obtained in accordance with the above-described double corresponding equations, and by generating and transferring the tooth form of the above-described equal altitude tooth on the opposing surface. In this case, assuming that an angle defined by a point B on an inner diameter $D_I$ of a single tooth and a point A on an outer diameter $D_O$ of the tooth is represented by $\alpha_H$, and the pitch angle of the teeth is represented by p, if $\alpha_H \geq P$, it is possible to always keep the condition that any part of the teeth is in engagement (since the engagement probability is enhanced), and it is therefore possible to perform a smooth operation with a low noise. Accordingly, the tooth width T that meets this condition ($\alpha_H \geq p$) is set.

7. In the second and third bevel gears $A_2$ and $A_3$ provided integrally with the rotary member 3, in the case where the twist angle δ is set in the direction indicated in FIG. 8 in the second bevel gear $A_2$, the twist angle 6 is set in a direction shown in FIG. 9 (opposite direction to that of FIG. 8) in the third bevel gear $A_3$ so that the same effect as that of a herringbone gear may be obtained. (Incidentally, the pitch circle PCD' of the corresponding spur gear is schematically shown in FIG. 9.)

By the way, with respect to the bevel gears having this skew, both the engagement point $C_1$ between the first and second bevel gears $A_1$ and $A_2$ and the engagement point $C_2$ between the third and fourth bevel gears $A_3$ and $A_4$ are not located in the same quadrant of the XY coordinate shown in FIG. 1, but the engagement points may be arranged in the different quadrants (for example, first and third quadrants). Accordingly, it is possible to apply the form of this embodiment not only to the form of the above-described first to third embodiments but also to the conventional Coriolis gear assembly shown in FIG. 15. Then, the engagement probability of each gear is enhanced so that the smooth operation may be obtained at a low noise, which is an advantage of the bevel gear.

By the way, the following machining apparatus for the above-described bevel gears is used. The present applicants discloses the detail of the machining apparatus for the Coriolis gears in Japanese Patent Application No. Hei 8-358650. This machining apparatus may be used. This machining apparatus will now be explained briefly.

As shown in FIG. 10, in the machining apparatus 107, a top surface of a body 108 serves as a turntable 109 that may be rotated relative to the body 108. A drive shaft 111 is projected from a center of the turntable 109, and a servo motor 110 is connected to a lower end portion of the drive shaft 111. Also, a slant portion 111a having a predetermined angle λ relative to the axis of the drive shaft 111 is provided at an end of the drive shaft 111. A rotary plate 112 is supported through a bearing to the slant portion 111a. A pair of Coriolis gears are formed between facing surfaces of the rotary plate 112 and that of the turntable 109. The gear formed on the turntable 109 is the first gear $A_1'$. Also, the gear formed on the rotary plate 112 is the second gear $A_2'$. Since the turntable 109 and the axis of the drive shaft 111 are arranged to be perpendicular to each other, the angle defined by the turntable 109 and the rotary plate is also the angle.

The rotary plate 112 holds a workpiece 113 while making the swivel center $P_1$ of the Coriolis gear pair $A_1'$ and $A_2'$ in accordance with the swivel center point of the workpiece 113 when the workpiece 113 is installed in the gear assembly and takes a Coriolis motion. The swivel table 109 is rotatably supported to the body 108 by a bearing 115. Then, a worm wheel 116 is mounted concentrically on the swivel table 109. A worm 117 is provided on the body 108 at a position where it engages with the worm wheel 116. Then, the worm 117 is rotated by a drive means such as a motor (not shown) to thereby drive the worm wheel 116 and to drivingly rotate the swivel table 109.

Furthermore, the machining apparatus is provided with a cutter 118 for forming a tooth form. The cutter 118 is supported by a positioning device 119 that is controlled on the NC basis and is projectable/retractable relative to the workpiece 113. Also, the cutter 118 may move by a stroke L in a tooth line direction (direction having an angle $\lambda'=\frac{1}{2}\lambda$ with respect to the horizontal direction) provided in the workpiece 113 while rotating. This stroke L is somewhat longer than a desired tooth width. In addition, the moving direction of the cutter 118 is taken in the direction δ relative to the surface to be worked of the workpiece shown in FIG. 8, thereby generating the skew.

In the workpiece 113 fixed to a projection 112a of the rotary plate 112, the swivel center $P_1$ of the Coriolis gear pair $A_1'$ and $A_2'$ is made in accordance with the swivel center point when the workpiece 113 is installed in the gear assembly and takes a Coriolis motion. Then, when the drive shaft 111 is rotated, the slant portion 111a takes a motion like a neck swing. The rotary plate 113 takes a neck swing motion, i.e., the Coriolis motion.

Accordingly, the cutter 118 is moved in a desired tooth line direction in synchronism with a timing of one forward rotational turn of the drive shaft 111 so that the tooth forms are to be formed one by one on the surface to be worked of the workpiece 113. Also, since the condition that the swivel center $P_1$ of the Coriolis gear pair $A_1'$ and $A_2'$ is made in accordance with the swivel center point when the workpiece 113 is installed in the gear assembly and takes a Coriolis motion is kept, the surface to be worked of the workpiece 113 forms the moving locus of the third gear $A_3'$ integral with the second gear $A_2'$ formed on the rotary plate 112. Accordingly, when the teeth are ground on the surface to be worked of the workpiece 113, the cutter 118 becomes a gear which is one of the pair with the workpiece 113 (hypothetical fourth gear $A_4'$) so that the tooth form formed on the surface to be worked of the workpiece 113 is an ideal tooth form as a third gear $A_3'$.

By the way, in order to obtain the gear pair $A_1$ and $A_2$ and the gear pair $A_3$ and $A_4$ out of the bevel gears that form the differential gear assembly, if the teeth of the gear $A_1$ are reference teeth (parent teeth), it is sufficient to generate and process teeth of the gear $A_2$. In the same way, if the teeth of the gear As are reference teeth (parent teeth), it is sufficient to generate and process teeth of the gear $A_4$. In the embodiment, the gears $A_2$ and $A_3$ are generated and processed. When the reference teeth (teeth of the gears $A_1$ and $A_4$) are processed, the first gear $A_1$40, the second gear $A_2'$ and the drive shaft 111 of the machining apparatus 107 are dispensed with, the machining apparatus (having a general index table) in which the rotary plate 112 is fixed directly to the turntable 109, and the worm 117 is rotated, whereby the worm wheel 116 is driven and the turntable 109 is drivingly rotated. Thus, any desired tooth number is determined and the cutter 118 is moved in the direction of the angle $\lambda'=\lambda$ defined with respect to the horizontal line to process the teeth.

Also, any arm type (bite type) cutter or a conical hob cutter is used instead of the above-described cutter, so that the tooth line to be generated takes a trochoid curve and a spiral bevel gear having an equal altitude may be formed.

As described above, if the machining apparatus 107 shown in FIG. 10 is used, the workpiece 113 is fixed to a motion system which takes the same motion as the Coriolis motion required for the gears, and the cutter having any tooth form is moved in the direction of the tooth line in synchronism with the Coriolis motion of the motion system. As a result, under the same motion condition as the Coriolis motion required when the workpiece is used as the gear, the gears are generated. The above-described desired cutter may generate the desired tooth form while the gear that may form one of the pair with the workpiece is in contact with the workpiece as if it would engage with the workpiece.

Figure 11:
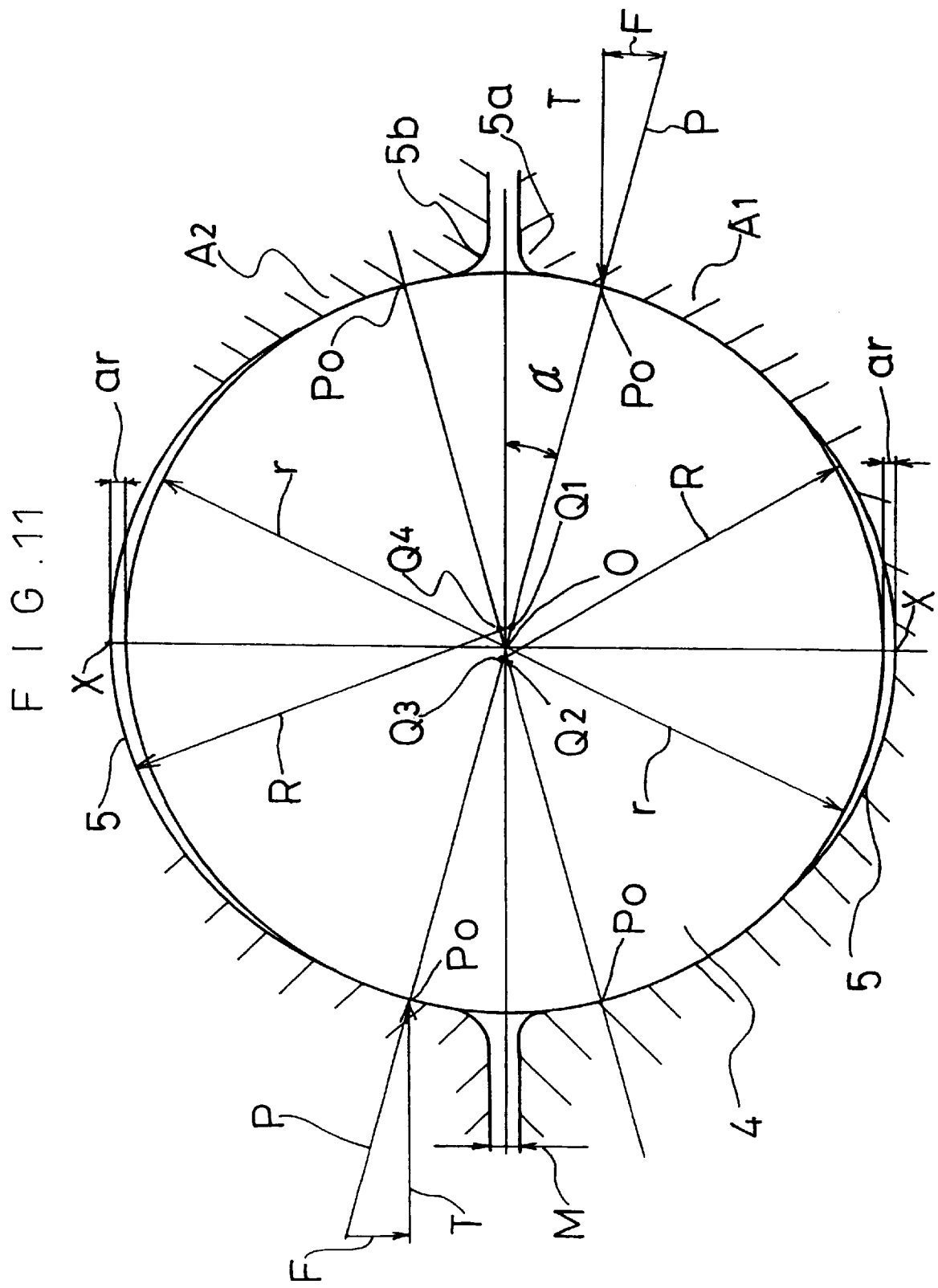
FIG. 11 is an enlarged cross-sectional view showing a tooth form used in a speed change gear assembly in accordance with the fifth embodiment of the present invention.

A fifth embodiment of the invention will now be described with reference to FIGS. 11 and 12. Also, in this embodiment, the same reference numerals are used to indicate the same parts as and the like parts of the conventional example, and the detailed explanation therefor will be omitted.

The following shape is used as the tooth form of the Coriolis gear apparatus in this embodiment. FIG. 11 is a cross-section taken along the line I—I of FIG. 6 (showing a portion of the tooth engagement on an enlarged scale). There are shown the first gear $A_1$, the second gear $A_2$ and the roller 4. A cross-section of the roller 4 used here is of a true circle. In contrast, the inscribed surface 5 with the rollers has the following shape. A contact angle between the roller 4 and the inscribed surface 5 with the roller is defined by α as shown. The value of α may be set as desired. It is possible to set the value for the first gear $A_1$ and the second gear $A_2$, respectively. Also, the contact point between the roller 4 and the inscribed surface 5 is represented by Po. When the cross-sectional radius of the roller 4 is set as $r_1$, the inscribed surface 5 has a cross-section which is circumscribed with the roller 4 at the contact point Po with a radius R=kr. Here, k is a coefficient within the range of 1.001<k<1.2. Since the coefficient k is greater than 1, the inscribed surface 5 is more separated from the outer circumference of the roller 4 as it is remoter from the contact point Po. Then, curved surfaces passing through each contact point Po are intersected with each other a vertical line passing through the center point O of the roller 4, and a gap defined by ar (a>0) is formed. If the position where these planes are represented by point x, a somewhat sharp convex is formed at point x. Incidentally, the dimension indicated by M in FIG. 11 is the distance between the first gear $A_1$ and the second gear $A_2$.

By the way, comparing an end portion 5a of the roller inscribed surface 5 of the first gear $A_1$ with an end portion 5b of the second gear $A_2$, a radius of the end portion 5b is greater than the other. The reason for this is that a so-called escape for engaging well the inscribed surface 5 of the second gear $A_2$ with the roller 4, even if, when the inscribed surface 5 of the second gear $A_2$ is engaged with the roller 4 provided on the first gear $A_1$, there would be a slight positional displacement between them.

Figure 12:
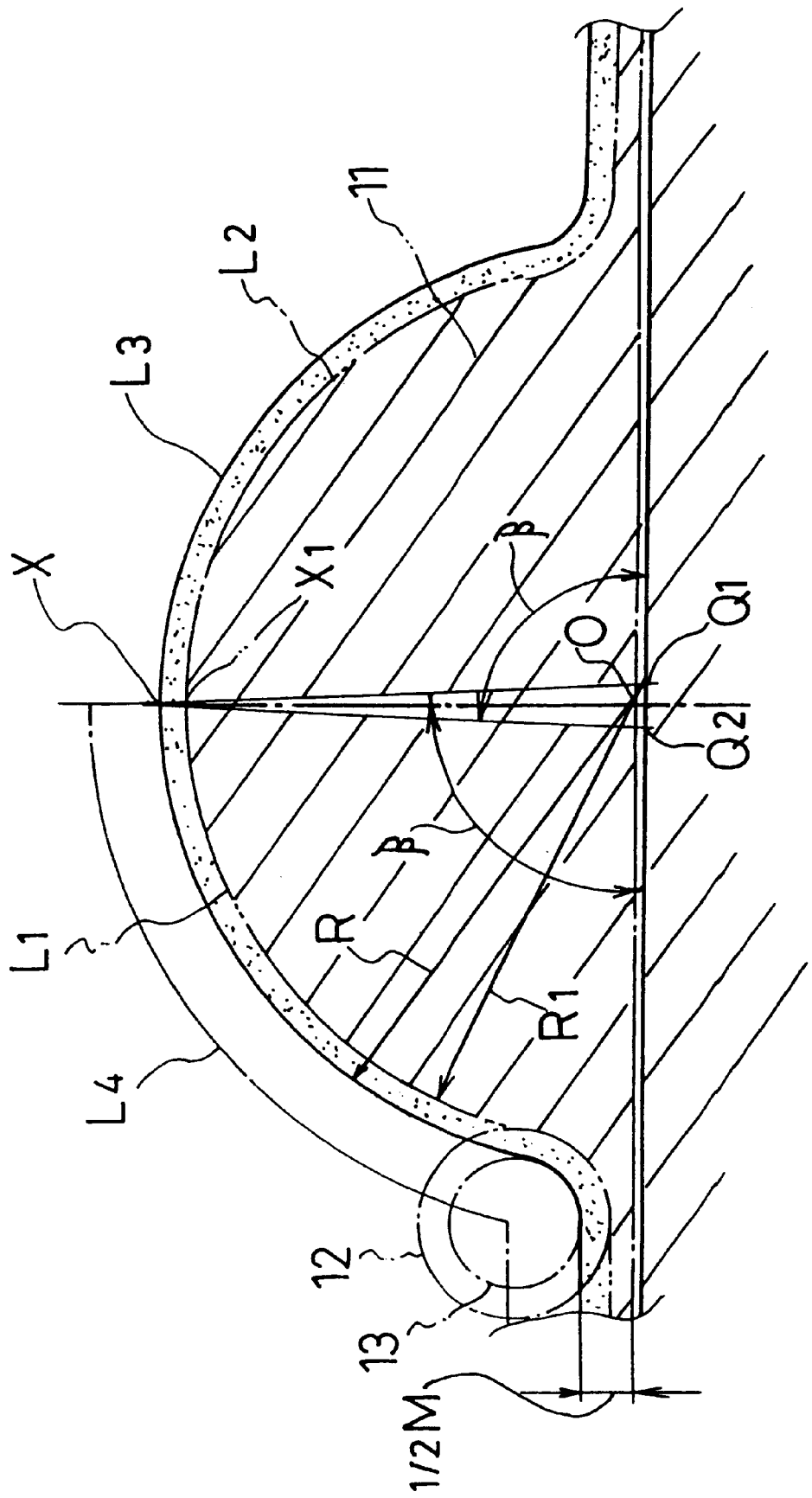
FIG. 12 is an enlarged cross-section showing a tool shape for forming a tooth shape shown in FIG. 11.

FIG. 12 shows a cross-sectional shape of end face portion of a tool (cutter wheel or the like) for forming the above-described tooth shape. The order of the manufacturing steps is as follows. First of all, a base 11 having a convex shape shown indicated by two dotted lines $L_1$ and $L_2$ is formed by a diamond cutter (or a CBN cutter and any bite cutter) 12. In this case, assuming that a center point of each inscribed surface located on a line connecting the center O of the roller 4 to each contact point Po shown in FIG. 11 is $Q_1$, $Q_2$, $Q_3$ or $Q_4$, a circle having a radius $R_1$ ($R_1$<R) as a center corresponding to $Q_1$ is formed for the $L_1$ and a circle having a radius $R_1$ as a center corresponding to the point $Q_2$ is formed for the $L_2$ over an angle ($\beta$<90°) relative to the horizontal line, respectively.

Subsequently, a grinding material such as CBN particles is coated on the above-described base 11. Then, by again cutting the coated surface by a diamond cutter 13 having a different diameter, the tool shape shown by the solid line $L_3$ is formed. Here, the moving loci of the diamond cutters 12 and 13 are the same as indicated by the one-dotted line $L_4$ and a grinding particle layer having a uniform layer is formed on the surface of the base 11. The surface shape is such that the inscribed surface 5 shown in FIG. 11 may be formed.

The advantageous result obtained in accordance with the fifth embodiment of the invention with the above-described structure is as follows. When the engagement occurs between the first gear $A_1$ and the second gear $A_2$ as shown in FIG. 17, a load P is applied at the contact point Po to the roller 4 as shown in FIG. 11. The load P may be divided into a rotation torque transmission force T and a back surface force F=Ttan $\alpha$ (or F=Psin $\alpha$). The back surface force F urges the roller 4 to move away from the inscribed surface 5 (upward direction for the gear $A_1$ and downward direction for the gear $A_2$). By the way, the back surface force F is in proportion to the Hertzian stress. Accordingly, if the value of $\alpha$ is decreased to thereby decrease the value of F, the Hertzian stress is also decreased.

In this embodiment, since with the relationship of R>r, the gap ar is provided on the bottom portion of the inscribed surface 5, the roller 4 is subjected to the load P whereby it is guided by the curved shape of the inscribed surface 5, so that the force for moving toward the gap is generated. This force decreases the back surface force F. Also, with the gap of ar, it is possible to perform smoothly the discharge of the lubricant oil between the roller 4 and the inscribed surface 5 and to decrease a force in the direction of F. Accordingly, it is possible to decrease the Hertzian stress. A service life of the gear is in reverse proportion to the ninth powered value of the Hertzian stress. Accordingly, for example, if the Hertzian force is one third, the service life is prolonged about 20000 times.

Figure 13:
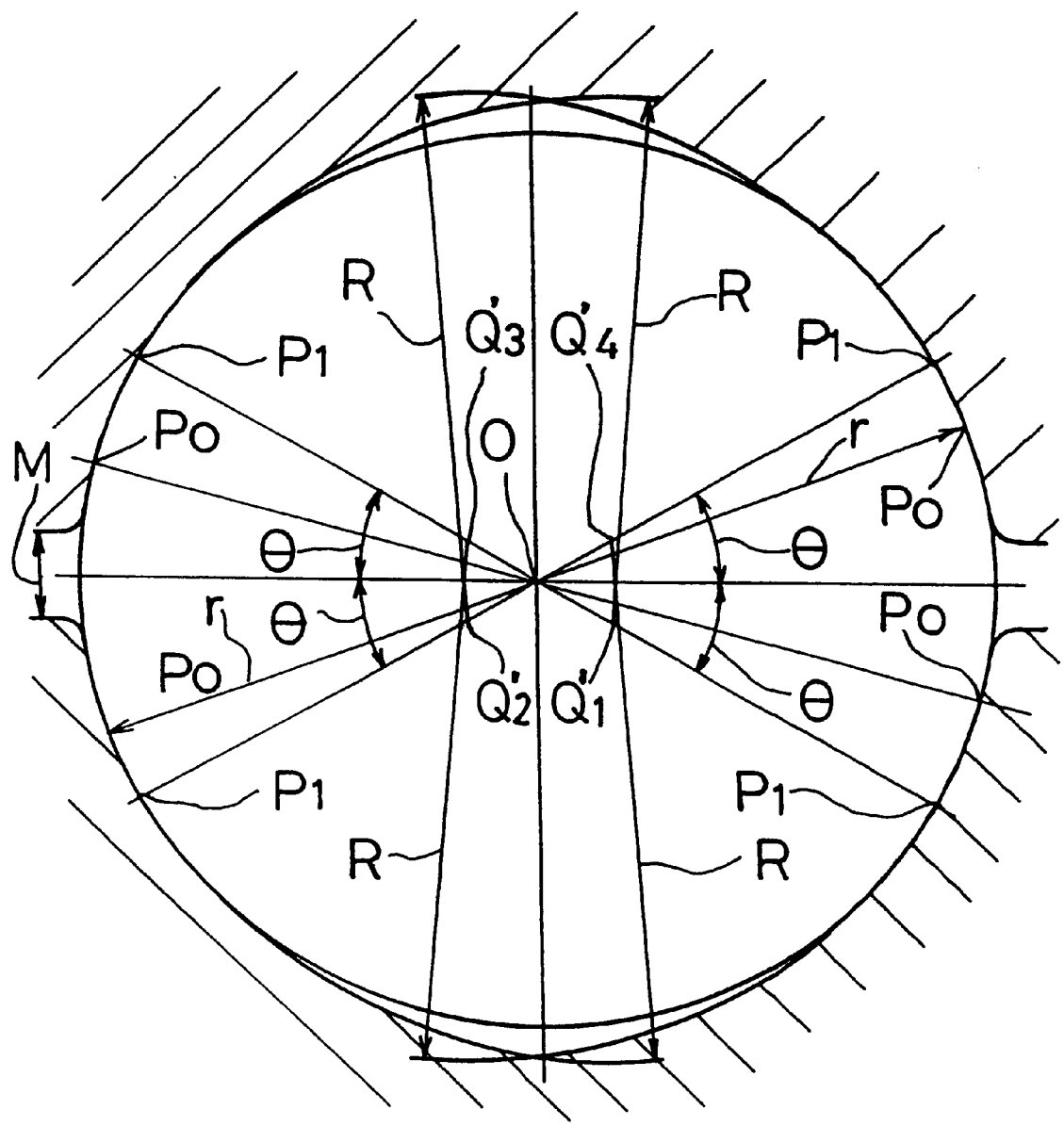
FIG. 13 is an enlarged cross-sectional view showing a modification of a tooth form used in the fifth embodiment of the present invention.

By the way, in the example shown in FIG. 12, a constant radius R=kr is considered as the shape of the inscribed surface 5. However, it is possible to obtain the same advantage even by using the shape that is gradually changed from the radius r to the radius R at the border of the point $P_1$ with a true circular shape of the radius r concentrically with the roller 4 in the vicinity of each contact point Po (any range $\theta$) as shown in FIG. 13.

Also, a method shown in FIG. 14 may be used. Incidentally, in an example of FIG. 14, the shape of the inscribed surface 5 is kept in right and left symmetric relation. This will now be explained. First of all, the contact angle between the roller 4 and the inscribed surface 5 is at any desired angle $\theta$o. In this case, the contact point is expressed by Po. Then, an inscribed surface $S_1$ having a radius $R_1$=kr passing through the contact point Po is formed. The center $O_1$ of the inscribed surface $S_1$ (radius $R_1$) located on a line between the contact point Po and the center o of the roller 4 is considered. Then, an inscribed surface S2 having a radius a radius $R_2$ ($R_2$>$R_1$), which is inscribed with the inscribed surface $S_1$ as a border of the point $P_1$ on the inscribed surface $S_1$ away from the contact point Po by a desired angle $\theta_1$ relative to the straight line PoO passing through $O_1$ is formed. These inscribed surfaces $S_2$ are intersected with each other on the vertical line passing through the center O of the roller 4. It is possible to obtain the same advantage by gradually changing the inscribed surface 5 from $R_1$ to $R_2$ (or further multiple stages).

The structure in accordance with the fifth embodiment of the invention will be summarized as follows. The feature is that, in a gear pair having teeth defined by the roller 4 which is the rolling member and the inscribed surface 5 which is a groove inscribed with the rolling member, the cross-section radius of the rolling member is r, the contact angle between the rolling member and the groove surface is $\alpha$, the cross section of the groove is formed in such a manner that it passes through the contact point between the rolling member and the groove surface and having its radius meeting the relationship of R=kr and k>1. In this case, it is preferable that the value of the coefficient k is in the range of 1.001 to 1.2. Also, it is possible to gradually change the cross-section radius of the groove from $R_1$ to $R_2$.

Furthermore, it is possible to gradually change the cross section of the groove from the cross-sectional shape having the radius r passing through the contact point between the rolling member and the groove surface to the cross-sectional shape having the radius R=kr. Incidentally, the above-described tooth form shape is not limited to that for the Coriolis gear assembly according to the present invention but may be applied to any type shape even if it is for the conventional Coriolis gear assembly, a spur gear, a skew gear or the like where this forms a gear pair defined by the rolling member and the groove inscribed with the rolling member. Also, also in the relationship between a ball feeding screw and a nut, if the above-described cross-sectional shape is applied to the screw grooves, it is possible to ensure the same advantage.

As described above, according to the present invention, it is possible to ensure the following advantages. In a speed change gear assembly according to the invention of claim 1, the center of the common spherical surface passing through each pitch circle of the first and second gears is made in accordance with the center of the common spherical surface passing through each pitch circle of the fourth and third bevel gears, the axis line of the input shaft is arranged on the X-axis of the XY coordinate having the origin as the center, and the engagement point between the first and second gears and the engagement point of the fourth and third gears are arranged in the same quadrant of the XY coordinate. As a result, it is possible to arrange the first to fourth gears in the same axial direction surface of the rotary member to thereby reduce the axial directional dimension of the gear assembly. Also, it is easy to arrange the output shaft in the coaxial manner with the input shaft and possible to respond to various demands. Accordingly, it is possible to broaden the application range of the Coriolis gear assembly that may obtain a large reduction speed ratio only with four gears.

Also, in a speed change gear assembly according to the invention of claim 2, the engagement point between the first and second gears and the engagement point between the third an fourth gears are arranged in the first and second quadrants or the third and fourth quadrants, whereby it is possible to arrange the first to fourth gears in the same axial direction surface of the rotary member and to reduce the axial directional dimension of the gear assembly. Also, if the two engagement points on both sides of the Y-axis are provided to be close to each other, it is possible to make closer to the maximum value the pitch circles of the first to fourth gears. Accordingly, it is possible to enhance the allowable torque of each gear pair. Thus, it is possible to enhance the freedom of design of the gear assembly and to expand the application range thereof.

Furthermore, in a speed change gear assembly according to the invention of claim 3, the above-described respective gears may be bevel gears, spiral gears or skew bevel gears, whereby the probability of the tooth engagement is enhanced and the adverse effect to the rotational non-uniformity caused by the manufacture errors of the gears is suppressed to provide a gear assembly with low noise and low vibration.

Also, in a speed change gear assembly according to the invention of claim 4, since the teeth of the above-described bevel gears are defined by the rollers and the inscribed surfaces, the Hertzian stress is reduced, and even if the design for the backlash is dispensed with and the suitable pre-pressure is applied to the teeth, the sliding motion generated upon the engagement of the gears may be absorbed by the rotation of the rollers. Accordingly, it is possible to simultaneously enhance the power transmission efficiency and the durability.

Furthermore, in a speed change gear assembly according to the invention of claim 5, it is possible to make the input shaft and output shaft hollow. For instance, the space within the input and output shafts is used for the through-passage passing through the speed change assembly so that it is possible to further expand the application range of the Coriolis gear.

Also, in a method for machining teeth of a speed change gear assembly according to the invention of claim 6, the teeth are generated in the same motion as the Coriolis motion which is required when the workpiece is used as a gear, a cutter having any desired tooth form is brought into contact with the workpiece as if the gear that forms one of a pair with the workpiece would engage with the workpiece. Thus, any desired tooth form may be generated. Accordingly, it is possible to obtain a gear speed change assembly with a high precision.

Also, in a speed change gear assembly according to the invention of claim 7, it is possible to realize a mass production due to a one-shot multiple products or manufacture an extremely small gear by a pressing work using an ultra-strong thin steel plate, an aluminum cold forging pressing work, or a resin molding pressing work with ultra-high molecule. It is possible to provide a gear assembly for a micro-machine or a heavy duty machine, or a low cost gear assembly (in case of resin products).

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A speed change gear assembly in which the respective axes of the first gear having a tooth number $N_1$ fixed to a housing and the fourth gear having a tooth number $N_4$ mounted on an output shaft are made in accordance with each other relative to the axis of an input shaft, and a rotary member provided integrally with the second gear having a tooth number $N_2$ and the third gear having a tooth number $N_3$ are supported rotatably on a slant portion of said input shaft so that the second gear is engaged with the first gear and the third gear is engaged with the fourth gear, characterized in that:

a center of a common spherical surface passing through each pitch circle of the first and second gears is made in accordance with a center of a common spherical surface passing through each pitch circle of the third and fourth gears, the axis of said input shaft is disposed on an X-axis of a coordinate XY having an origin at the center, and an engagement point between the first and second gears and an engagement point between the fourth and third gears are always disposed in such a manner that the engagement points are positioned in the same quadrant of the XY coordinate when rotated around the X-axis; and an angle defined by said input shaft and its slant portion is θ, an angle between a plane perpendicular to a rolling surface of each gear and a centerline of each pitch cone is $θ_1$ to $θ_4$ for each of the first to fourth gears, a relationship of $θ_1+θ_2=θ_3+θ_4=θ$, an equal altitude tooth is formed on either side of facing roller surfaces by a cutter having the respective any tooth forms of the first to fourth gears obtained on the assumption of corresponding cylindrical gears each having a corresponding tooth number $Z_1$, $Z_2$, $Z_3$ and $Z_4$ given:

$Z_1=N_1/\sin θ_1$ $Z_2=N_2/\sin θ_2$ $Z_3=N_3/\sin θ_3$ $Z_4=N_4/\sin θ_4$ with a corresponding pitch radius being a distance from the rolling surface of each bevel gear to an intersection between a plane perpendicular to the rolling surface and a centerline of each pitch cone, and the tooth form of the equal altitude tooth is generated and transferred on the associated surface.

2. The speed change gear assembly according to claim 1, further characterized in that the engagement point between the first and second gears and the engagement point between the third and fourth gears are always disposed in such a manner that the engagement points are positioned in the first quadrant and the second quadrant or the third quadrant and the fourth quadrant when rotated around the X-axis, respectively, instead of disposing the engagement point between the first and second gears and the engagement point between the third and fourth gears in the same zone of said XY coordinate.

3. The speed change gear assembly according to claim 1, further characterized in that said respective gears are bevel gears, spiral bevel gears or skew bevel gears.

4. The speed change gear assembly according to claim 1, further characterized in that said respective gears are defined by rollers and inscribed surfaces with the rollers.

5. The speed change gear assembly according to claim 1, further characterized in that said input shaft and said output shaft are hollow.

6. A machining process for teeth of a speed change gear assembly according to claim 1, the process comprising steps of:

fixing a workpiece to a motion system for performing the same motion as a Coriolis motion which is required for gears; and moving a cutter having any desired tooth form in a predetermined tooth line direction in synchronism with the Coriolis motion of said motion system, wherein teeth of the bevel gears used in the speed change gear assembly are generated in the workpiece.

7. The machining process according to claim 6, further comprising steps of:

producing molds in which the tooth form formed by the fixing and cutting steps is incorporated; and forming gears by one of a hot die-cast method, a cold pressing method and a resin molding pressing method with the molds.

8. A machining process for processing teeth of each gear of a speed change gear assembly in which respective axes of the first gear having a tooth number $N_1$ fixed to a housing and the fourth gear having a tooth number $N_4$ mounted on an output shaft are made in accordance with an axis of an input shaft and a rotary member provided integrally with the second gear having a tooth number $N_2$ and third gear having a tooth number $N_3$ is supported rotatably on a slant portion so that the second gear is engaged with the first gear and the third gear is engaged with the fourth gear, comprising the steps of:

(a) arranging the axis of the input shaft on an X-axis of a coordinate XY established in such a manner as a point where a center of a common spherical surface passing through each pitch circle of the first and second gears is in coincidence with a center of a common spherical surface passing through each pitch circle of the third and fourth gears is defined as an origin thereof, and arranging an engagement point between the first and second gears and an engagement point between the fourth and third gears always in the same quadrant of the XY coordinate, or in the first quadrant and second quadrant or in the third quadrant and fourth quadrant, when each gear is rotated around the X-axis;

(b) generating an equal altitude tooth in a workpiece fixed to a motion system for performing the same motion as a Coriolis motion which is required for each gear in such a manner as a cutter, having desired tooth shape to be obtained from corresponding cylindrical gears defined in such a manner as an angle defined by said input shaft and its slant portion is $\theta$, an angle between a plane perpendicular to a rolling surface of each gear and a centerline of each pitch cone is $\theta_1$ to $\theta_4$ for each of the first to fourth gears, a relationship of $\theta_1$ to $\theta_4$ for each of the first to fourth gears, a relationship of $\theta_1+\theta_2=\theta_3+\theta_4=\theta$ is satisfied, a distance from the rolling surface of each gear to an intersection between a plane perpendicular to the rolling surface and a centerline of each pitch cone is a corresponding pitch radius, and corresponding tooth number $Z_1$, $Z_2$, $Z_3$ and $Z_4$ satisfy the following formulae, $Z_1 = N_1/\sin\theta$, $Z_2 = N_2/\sin\theta_2$, $Z_3 = N_3/\sin\theta_3$, $Z_4 = N_4/\sin\theta_4$, is moved in a predetermined tooth-line direction in synchronism with the Coriolis motion in the motion system of the workpiece.

9. The machining process for processing teeth of a gear of the speed change gear assembly according to claim 8, further comprising the step of moving the cutter so as to form one of a bevel gear, a spiral gear and a skew bevel gear.

10. The machining process for processing teeth of the gear of the speed change gear assembly according to claim 8, further comprising the step of forming a shape of the cutter in section as a shape for forming an inscribed surface with the rollers.

11. The machining process for processing teeth of the gear of the speed change gear assembly according to claim 9, further comprising the step of forming a shape of the cutter in section as a shape for forming an inscribed surface with the rollers.

12. The machining process for processing teeth of the gear of the speed change gear assembly, according to claim 8, further comprising the steps of:

transferring a tooth shape formed by any one of the machining processes for the teeth to molds; and forming the gear by one of a hot die-cast method, a cold pressing method and a resin molding pressing method with the molds.

13. The machining process for processing teeth of the gear of the speed change gear assembly, according to claim 9, further comprising the steps of:

transferring a tooth shape formed by any one of the machining processes for the teeth to molds; and forming the gear by one of a hot die-cast method, a cold pressing method and a resin molding pressing method with the molds.

14. The machining process for processing teeth of the gear of the speed change gear assembly, according to claim 10, further comprising the steps of:

transferring a tooth shape formed by any one of the machining processes for the teeth to molds; and forming the gear by one of a hot die-cast method, a cold pressing method and a resin molding pressing method with the molds.

15. The machining process for processing teeth of the gear of the speed change gear assembly, according to claim 11, further comprising the steps of:

transferring a tooth shape formed by any one of the machining processes for the teeth to molds; and forming the gear by one of a hot die-cast method, a cold pressing method and a resin molding pressing method with the molds.

* * * * *